US008924689B2

(12) United States Patent
Nakaya et al.

(10) Patent No.: US 8,924,689 B2
(45) Date of Patent: Dec. 30, 2014

(54) SEMICONDUCTOR DEVICE WITH INSTRUCTION CODE AND PREFIX CODE PREDECODERS

(75) Inventors: Hiroaki Nakaya, Kokubunji (JP); Yuki Kondoh, Hino (JP); Makoto Ishikawa, Kodaira (JP)

(73) Assignee: Renesas Electronics Corporation, Kawasaki-shi (JP)

(*) Notice: Subject to any disclaimer, the term of this patent is extended or adjusted under 35 U.S.C. 154(b) by 1071 days.

(21) Appl. No.: 12/915,158

(22) Filed: Oct. 29, 2010

(65) Prior Publication Data

US 2011/0107064 A1 May 5, 2011

(30) Foreign Application Priority Data

Oct. 30, 2009 (JP) ................................ 2009-249853

(51) Int. Cl.
*G06F 9/30* (2006.01)
*G06F 9/38* (2006.01)

(52) U.S. Cl.
CPC .......... *G06F 9/30149* (2013.01); *G06F 9/3017* (2013.01); *G06F 9/30185* (2013.01); *G06F 9/382* (2013.01); *G06F 9/3822* (2013.01)
USPC .......................................................... 712/213

(58) Field of Classification Search
None
See application file for complete search history.

(56) References Cited

U.S. PATENT DOCUMENTS 5,495,617 A * 2/1996 Yamada ........................ 713/323
6,460,132 B1 * 10/2002 Miller .......................... 712/213
2004/0039897 A1 * 2/2004 Kudo ............................ 712/213

FOREIGN PATENT DOCUMENTS

JP 2000-284962 A 10/2000
JP 2004-30015 A 1/2004

OTHER PUBLICATIONS

Markus Levy, "ARM Grows More Thumbs", Microprocessor Report, 6/17/03-02, Jun. 2003.

SH-4A Software Manual, [retrieved on Oct. 19, 2009], Internet URL http://documentation.renesas.com/jpn/products/mpumcu/rjjo9b0090_sh4a.pdf, p. 3-9 ~ p. 3-19, Tables 3.4, 3.5, 3.6, 3.9, 3.10 and 3.13.

SH-4A Software Manual, [retrieved on Oct. 19, 2009], Internet URL http://documentation.renesas.com/eng/products/mpumcu/rej09b0003_sh4a.pdf, p. 33-42 Tables 3.4, 3.5, 3.6, 3.9, 3.10 and 3.13.

* cited by examiner

*Primary Examiner* — Andrew Caldwell
*Assistant Examiner* — John Lindlof
(74) *Attorney, Agent, or Firm* — Miles & Stockbridge P.C.

(57) ABSTRACT

The present invention realizes an efficient superscalar instruction issue and low power consumption at an instruction set including instructions with prefixes. An instruction fetch unit is adopted which determines whether an instruction code is of a prefix code or an instruction code other than it, and outputs the result of determination and the 16-bit instruction code. Along with it, decoders each of which decodes the instruction code, based on the result of determination, and decoders each of which decodes the prefix code, are disposed separately. Further, a prefix is supplied to each decoder prior to a fixed-length instruction code like 16 bits modified with it. A fixed-length instruction code following the prefix code is supplied to each decoder of the same pipeline as the decoder for the prefix code.

14 Claims, 13 Drawing Sheets

FTC DEC DPD0 DPD1 DPD2 DPD3 IREG0 IREG1 IREG2 IREG3 PRDEC DSB SEL0 SEL1 SEL2 SEL3 SELA SELB SELC SELD DB0 DB1 DB2 DB3 PRFDEC1 BDYDEC1 PRFDEC2 BDYDEC2 Pipe1 Pipe2 I0 I1 I2 I3 A0 A1 A2 A3 S0 S1 S2 S3 Ih Ah Ii Ai Ij Aj Ik Ak

| | | CYC1 | CYC2 |
|---|---|---|---|
| A | I16(0) | (Pipe1)BDYDEC1 | |
| | I16(1) | | (Pipe1)BDYDEC1 |
| | I16(2) | (Pipe2)BDYDEC2 | |
| | I16(3) | | (Pipe2)BDYDEC2 |
| B | I16(0) | (Pipe1)BDYDEC1 | |
| | I16(1) | | (Pipe1)BDYDEC1 |
| | Iprf(2) | (Pipe2)PREDEC2 | |
| | I16(3) | | (Pipe2)BDYDEC2 |
| C | Iprf(0) | (Pipe1)PREDEC1 | |
| | I16(1) | | (Pipe1)BDYDEC1 |
| | I16(2) | (Pipe2)BDTDEC2 | |
| | I16(3) | | (Pipe2)BDYDEC2 |
| D | I16(0) | (Pipe1)BDYDEC1 | |
| | Iprf(1) | (Pipe2)PREDEC2 | |
| | I16(2) | | (Pipe2)BDYDEC2 |
| | I16(3) | | (Pipe1)BDYDEC1 |
| E | Iprf(0) | (Pipe1)PREDEC1 | |
| | I16(1) | | (Pipe1)BDYDEC1 |
| | Iprf(2) | (Pipe2)PREDEC2 | |
| | I16(3) | | (Pipe2)BDYDEC2 |

Fig.11

| | | CYC1 | CYC2 |
|---|---|---|---|
| A | I16(0) | (Pipe1)BDYDEC1 | |
| | I16(1) | | (Pipe1)BDYDEC1 |
| | I16(2) | (Pipe2)BDYDEC2 | |
| | I16(3) | | (Pipe2)BDYDEC2 |
| B | I16(0) | (Pipe1)BDYDEC1 | |
| | I16(1) | | (Pipe1)BDYDEC1 |
| | Iprf(2) | (Pipe2)PREDEC2 | |
| | I16(3) | | (Pipe2)BDYDEC2 |
| C | Iprf(0) | (Pipe1)PREDEC1 | |
| | I16(1) | | (Pipe1)BDYDEC1 |
| | I16(2) | (Pipe2)BDYDEC2 | |
| | I16(3) | | (Pipe2)BDYDEC2 |
| D | I16(0) | (Pipe1)BDYDEC1 | |
| | Iprf(1) | (Pipe2)PREDEC2 | |
| | I16(2) | | (Pipe2)BDYDEC2 |
| | I16(3) | | (Pipe1)BDYDEC1 |
| E | Iprf(0) | (Pipe1)PREDEC1 | |
| | I16(1) | | (Pipe1)BDYDEC1 |
| | Iprf(2) | (Pipe2)PREDEC2 | |
| | I16(3) | | (Pipe2)BDYDEC2 |
| F | I16(0) | (Pipe2)BDYDEC2 | |
| | I16(1) | | (Pipe1)BDYDEC1 |
| | I32U(2) | 32UDEC | |
| | I32L(3) | | 32LDEC |
| G | I32U(0) | 32UDEC | |
| | I32L(1) | | 32LDEC |
| | I16(2) | (Pipe2)BDYDEC2 | |
| | I16(3) | | (Pipe1)BDYDEC1 |
| H | I16(0) | (Pipe2)BDYDEC2 | |
| | I32U(1) | 32UDEC | |
| | I32L(2) | | 32LDEC |
| | I16(3) | | (Pipe1)BDYDEC1 |
| I | I32U(0) | 32UDEC | |
| | I32L(1) | | 32LDEC |
| | Iprf(2) | (Pipe2)PREDEC2 | |
| | I16(3) | | (Pipe2)BDYDEC2 |
| J | Iprf(0) | (Pipe1)PREDEC1 | |
| | I16(1) | | (Pipe1)BDYDEC1 |
| | I32U(2) | 32UDEC | |
| | I32L(3) | | 32LDEC |
| K | I32U(0) | 32UDEC | |
| | I32L(1) | 32LDEC | |
| | I32U(2) | | 32UDEC |
| | I32L(3) | | 32LDEC |

FTCE
DECE
DPD0
Pipe1
I0
IREG0
PRDEC
SEL0
DB0
PRFDEC1
A0
DSB
S0
SELA
BDYDEC1
DPD1
I1
IREG1
PRDEC
SEL1
DB1
32b-D
A1
DSB
S1
SELB
SDBE
32UDEC
32LDEC
DPD2
I2
IREG2
PRDEC
SEL2
DB2
A2
DSB
S2
SELC
BDYDEC2
DPD3
I3
IREG3
PRDEC
SEL3
DB3
PRFDEC2
A3
DSB
S3
SELD
Pipe2

Fig.15

| | | | |
|---|---|---|---|
| A | I16(0) | (Pipe2)BDYDEC2 | |
| | I16(1) | | (Pipe1)BDYDEC1 |
| | I32U(2) | 32UDEC | |
| | I32L(3) | 32LDEC | |
| B | I32U(0) | 32UDEC | |
| | I32L(1) | 32LDEC | |
| | I16(2) | (Pipe2)BDYDEC2 | |
| | I16(3) | | (Pipe1)BDYDEC1 |
| C | I16(0) | (Pipe2)BDYDEC2 | |
| | I32U(1) | 32UDEC | |
| | I32L(2) | 32LDEC | |
| | I16(3) | | (Pipe1)BDYDEC1 |

SEMICONDUCTOR DEVICE WITH INSTRUCTION CODE AND PREFIX CODE PREDECODERS

CLAIM OF PRIORITY

The present application claims priority from Japanese patent application JP 2009-249853 filed on Oct. 30, 2009, the content of which is hereby incorporated by reference into this application.

FIELD OF THE INVENTION

The present invention relates to a data processor such as a microprocessor, a microcomputer or the like in which instructions of plural instruction lengths exist in mixed form, and to, for example, a technology effective when applied to a data processor capable of executing an instruction extended by a prefix code.

BACKGROUND OF THE INVENTION

Today's processors are broadly divided into a PC/server processor whose performance has been assigned the highest priority, and a built-in processor that requires the compatibility of high efficiency and high performance. As the built-in processor that needs high efficiency, an RISC (Reduced Instruction Set Computer) type built-in processor using a 16-bit fixed-length instruction set, which is capable of realizing high code efficiency, is in widespread use. The high code efficiency is essential to the effective use of an on-chip cache, a RAM and a ROM even at the present time that greater capacitance in an on-chip memory has been advanced. In the 16-bit fixed-length instruction set, however, a program size can be reduced, but on the other hand the number of instructions increases. In particular, the number of register-to-register transfer or immediate transfer instructions increases due to a restriction on operand designation. In order to obscure the latency of the increased transfer instructions, source forwarding for forwarding the value of a transfer source register instead of a transfer destination register has been commonly used. An increase in the number of instructions leads to performance degradation and an increase in electric power. The source forwarding for making up for the performance degradation contributes to a reduction in operating frequency and an increase in power through increases in both the critical path and the logic scale.

Such a problem arises from the fact that instruction code space for the 16-bit fixed-length instruction set is $2^{16}$B=64 kB, which is much smaller than $2^{32}$B=4 GB corresponding to instruction code space for a 32-bit fixed-length instruction set. Therefore, in an ARM Thumb-2 instruction set described in, for example, a Non-patent Document 1, a 16-bit fixed-length instruction and a 32-bit fixed-length instruction are allowed to exist in mixed form to thereby expand instruction code space. On the other hand, in a processor described in a Patent Document 1, a 16-bit prefix is added to a 16-bit fixed-length instruction set to thereby expand instruction code space. The prefix described herein is of an instruction code having the function of changing the meaning of an instruction code to be followed up and adding information to the followed-up instruction code. The prefix does not assume an instruction by itself. Incidentally, the prefix was used when the Intel's i386 processor published in 1985, which was used under the 16-bit architecture up to now, is brought to a 32-bit architecture while maintaining upward compatibility, and has been known for more than 20 years. In the i386 processor, the prefix is used to change the meaning of an operand size of the following instruction code. Since the i386 processor and its succeeding models are all CISC (Complicated Instruction Set Computer) type processors each using a variable-length instruction set, it can be said that an instruction decode circuit is originally complicated and the influence thereof on a realization circuit with the addition of the prefix is relatively small.

The prefix described in the Patent Document 1 has been used for a case in which an operand is added to a two-operand instruction to form a three-operand instruction, a case in which an index is added to an instruction of register indirect addressing to make a change to an instruction of register relative indirect addressing, and a case in which a source operand of a two-operand modify type instruction is altered to make a change to a three-operand instruction. The Patent Document 1 has disclosed a realization system with a scalar processor for decoding each instruction code in 16 bits being taken as an example. Since the prefix is also one instruction code, two cycles are required for decoding of a prefixed instruction, and two cycles are required even for its execution.

A processor in which the processor disclosed in the Patent Document 1 has been improved has been disclosed in a Patent Document 2. The Patent Document 2 discloses that as prefix's functions, a destination operand of a two-operand modify type instruction is altered to make a change to a three-operand type, and a bit width of a literal operand is expanded. Of the decoding of the prefixed instruction having required the two cycles in the Patent Document 1, the prefix's decoding is performed simultaneously with a preceding instruction to thereby obscure a prefix's decode cycle and realize one-cycle execution of the prefixed instruction.

As a system for coping with the problem that a register designation field cannot be secured at a 16-bit fixed-length instruction set, there is known an implicit fixed register designation. An SH-4A described in each of Non-patent Documents 2 and 3 defines an instruction under which one register R0 of sixteen general registers is used as an implicit fixed register. In compiler's register allocation, such an implicit fixed register use instruction is assigned R0 on a priority basis. This instruction is utilized to thereby reduce the demerit that the corresponding register is used as the fixed register. However, a reduction in the degree of freedom of a register designation by the fixed operand designation is not necessarily obscured sufficiently. In particular, a compiler's provider for a plurality of processors which intends to handle a variety of instruction set architectures with the same compile system, has a strong tendency not to use the merit of a specific architecture. There is therefore a case in which the utilization of the fixed register use instruction is insufficient. Namely, the fixed register use instruction is not necessarily sufficient as a countermeasure taken against the problem that a register designation field cannot be ensured. It can be said that a further improvement is necessary.

[Patent Document 1] Japanese Patent Laid-Open No. 2000-284962

[Patent Document 2] (Japanese Patent Laid-Open No. 2004-030015)

[Non-patent Document 1] Markus Levy, "ARM Grows More Thumbs," Microprocessor Report, 6/17/03-02, June 2003.)

[Non-patent Document 2] SH-4A Software Manual, [retrieved on Oct. 19, 2009], Internet URL http://documentation.renesas.com/jpn/products/mpumcu/rjj0 9b0090_sh4a.pdf, p. 3-9~p. 3-19, Tables 3.4, 3.5, 3.6, 3.9, 3.10 and 3.13

[Non-patent Document 3] SH-4A Software Manual, [retrieved on Oct. 19, 2009], Internet URL http://documentation.renesas.com/eng/products/mpumcu/rej09b0003_sh4a.pdf, pp. 33-42, Tables 3.4, 3.5, 3.6, 3.9, 3.10 and 3.13

SUMMARY OF THE INVENTION

As described above, there have been disclosed, as an instruction code space expansion system for compensating for the smallness of instruction code space for a 16-bit fixed-length instruction code, a system for allowing a 16-bit fixed-length instruction and a 32-bit fixed-length instruction to exist in mixed form to thereby expand instruction code space, and a system for adding a 16-bit prefix to a 16-bit fixed-length instruction set to thereby expand instruction code space. To described concretely, the latter discloses that an operand is added to a two-operand instruction to provide a three-operand format, an index is added to a register indirect addressing instruction to make a change to a register relative indirect addressing instruction, a source operand or destination operand of a two-operand modify type instruction is altered to make a change to a three-operand instruction, and a bit width of a literal operand is expanded. As a system for ensuring the number of operands without expanding the instruction code space, there is known an implicit fixed operand designation system.

When it is, however, not possible to cope by only the fixed register use instruction even if an attempt is made to utilize the advantages of the fixed register use instruction that the number of the operands can be ensured without expanding the instruction code space, there was not enough for the cited references to reduce the frequency of appearance of a transfer instruction, improve performance and cut down power consumption when the instruction code space was expanded.

A first object of the present invention is to provide a data processor equipped with an instruction decode function capable of contributing to a reduction in the frequency of appearance of a transfer instruction, an improvement in performance and cutting-down of power consumption when instruction code space is expanded by a prefix code that modifies an instruction code.

A second object of the present invention is to provide a data processor equipped with an instruction decode function which enables an efficient superscalar instruction issue at an instruction set including an instruction with a prefix, i.e., which is capable of bringing even a prefixed instruction to issue efficiency equivalent to that for a prefix-free instruction.

The above and other objects as well as novel features of the present invention will become apparent from the description of the present specification and the accompanying drawings.

A summary of exemplary ones of the inventions disclosed in the present application will be explained in brief as follows:

In order to achieve the first object, the present invention realizes a decode function by separately providing a prefix code decode unit and a fixed-length instruction decode unit so as to efficiently decode each prefix code for performing the following function conversion or expansion. The prefix code has the function of substituting, for example, a fixed register for the fixed register use instruction with another register or an immediate value. Another prefix code has the function of compressing each instruction code size without maintaining size orthogonality in the definition of a fixed register use instruction, with an instruction of a size low in the frequency of its use taken as a fixed register use instruction and an instruction of a size high in the frequency of its use taken as an instruction for designating a register in a register field, and substituting an instruction size being a size high in the frequency of its use with a size low in the frequency of its use by its corresponding prefix to thereby ensure the orthogonality of the instruction definition. Further, since operand fields required for size substitution are small in number, other expansions such as a sign extension/zero expansion of data and an extension of an immediate value and a bit width for displacement are set as one prefix code in addition to the above size change function, whereby the instruction-definition extension function based on the prefix code is enhanced. A prefix code according to yet another viewpoint is changed depending on the type of each instruction to be followed up.

According to the above means, for example, a decoder for a prefix code is added to a decoder for a prefix-free fixed-length instruction in order to decode a prefixed instruction. Thus, since the existing fixed-length instruction decode configuration is left as it is, and the added configuration of prefix-code decoder is adopted, it is possible to eliminate an influence exerted on the execution of the existing fixed-length instruction. The operation of the prefix-code decoder is stopped in execution of the fixed-length instruction, thereby making it possible to suppress power consumption. When prefix codes are unnecessary in development of a wide variety of products, the area and power consumption of a processor can be reduced by eliminating them in its logic synthesis by decode modules being divided.

In order to achieve the second object, an instruction fetch unit is adopted which determines whether an instruction code is of an instruction code of a fixed-length instruction or a prefix code and which outputs the result of determination and the instruction code. Along with it, there are adopted decoders which respectively separately decode the instruction and prefix codes, based on the result of determination. Further, a prefix is supplied to each decoder prior to a fixed-length instruction code modified with it, thereby making it possible to modify the operation of decoding the fixed-length instruction according to the result of decoding of the prefix code. Since the prefix code modifies a fixed-length instruction code to be followed up, the fixed-length instruction code following the prefix code is supplied to each decoder of the same pipeline as the corresponding decoder for the prefix code.

Advantageous effects obtained by an exemplary one of the inventions disclosed in the present application will be explained in brief as follows:

When instruction code space is expanded by a prefix code that modifies an instruction code, it can contribute to a reduction in the frequency of appearance of a transfer instruction, an improvement in performance and a reduction in power consumption.

An efficient superscalar instruction issue is enabled at an instruction set including an instruction with a prefix.

BRIEF DESCRIPTION OF THE DRAWINGS

FIG. 11 is an explanatory diagram illustrating the form of generation of selection signals by a selection control circuit shown in FIG. 10;

FIG. 15 is an explanatory diagram illustrating the forms of selection of selection signals S0 through S3 in such a manner that a timing control circuit STMGE is realized in the seventh and eighth embodiments.

DETAILED DESCRIPTION OF THE PREFERRED EMBODIMENTS

1. Summary of the Preferred Embodiments

Figure 1:
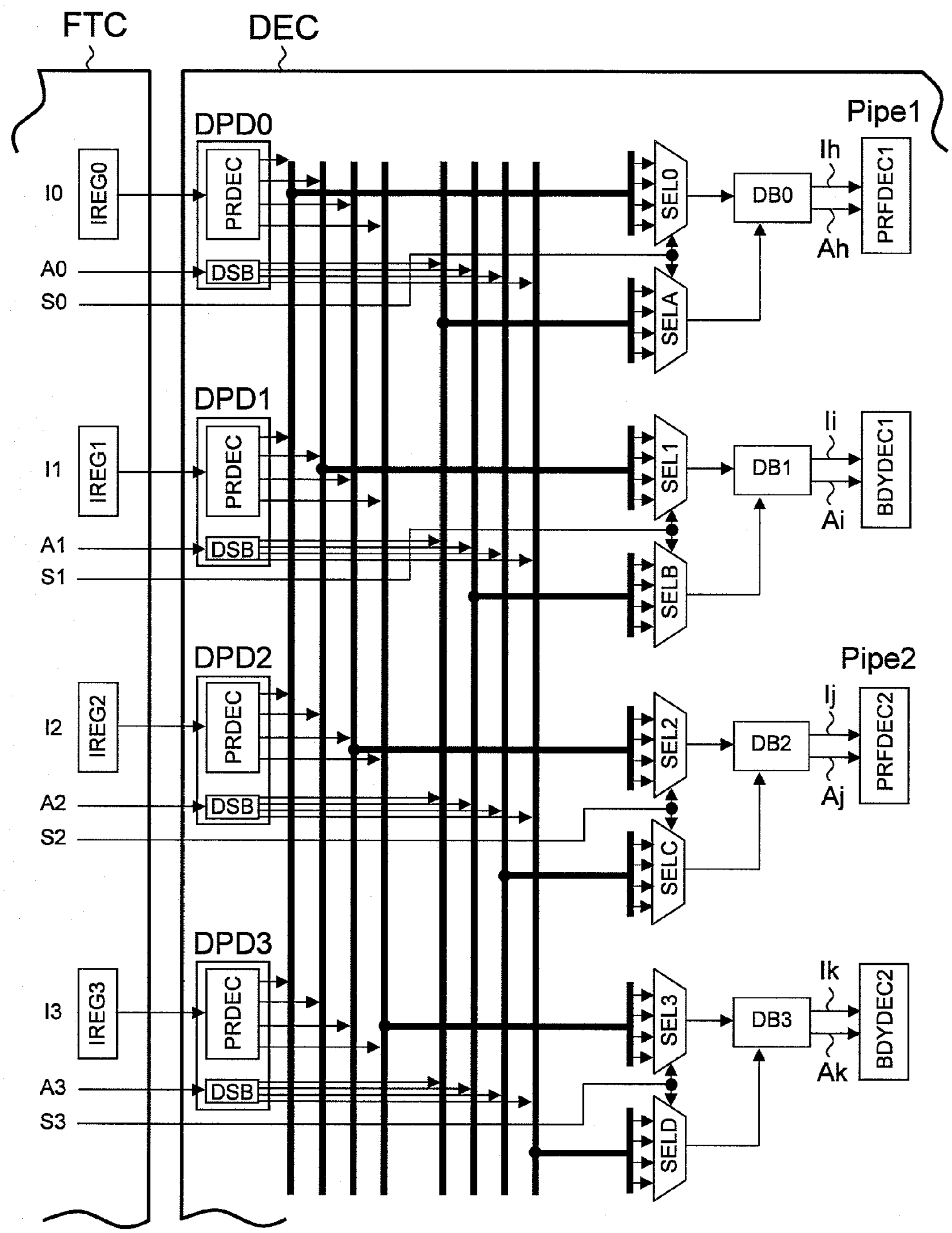
FIG. 1 is a block diagram of a first embodiment illustrating an instruction fetch unit and an instruction decode unit in a data processor capable of executing a variable-length instruction using each of prefix codes.

A summary of exemplary embodiments of the invention disclosed in the present application will first be described. Reference numerals in the accompanying drawings referred to with parentheses in the description of the summary of the exemplary embodiments only illustrate elements included in the concept of components to which the reference numerals are given.

[1] A data processor according to an exemplary embodiment of the present invention comprises a first mode corresponding to a fixed-length instruction of a first instruction length, and a second mode corresponding to a variable-length instruction set as a second instruction length with each prefix being applied to the fixed-length instruction of the first instruction length. The data processor comprises first, second, third and fourth predecoders (FPD0 through FPD3) each of which performs predecoding for determining whether an input instruction corresponds to a fixed-length instruction in the first mode, a fixed-length instruction corresponding to part of a variable-length instruction in the second mode or a prefix corresponding to part of the variable-length instruction in the second mode; a first pipeline (Pipe1) having a first prefix code decode unit (DB0 and PRFDEC1) and a first fixed-length instruction decode unit (DB1 and BDYDEC1); a second pipeline (Pipe2) having a second prefix code decode unit (DB2 and PRFDEC2) and a second fixed-length instruction decode unit (DB3 and BDYDEC2); a first selector (SELB) for selecting one of the outputs of the first, second, third and fourth predecoders and outputting it to the first fixed-length instruction decode unit; a second selector (SELD) for selecting one of the outputs of the first, second, third and fourth predecoders and outputting it to the second fixed-length instruction decode unit; a third selector (SELA) for selecting one of the outputs of the first, second, third and fourth predecoders and outputting it to the first prefix code decode unit; and a fourth selector (SELC) for selecting one of the outputs of the first, second, third and fourth predecoders and outputting it to the second prefix code decode unit.

In the first mode, a first fixed-length instruction is inputted to the first predecoder, a second fixed-length instruction is inputted to the second predecoder, a third fixed-length instruction is inputted to the third predecoder, and a fourth fixed-length instruction is inputted to the fourth predecoder. The first predecoder predecodes the first fixed-length instruction, the second predecoder predecodes the second fixed-length instruction, the third predecoder predecodes the third fixed-length instruction, and the fourth predecoder predecodes the fourth fixed-length instruction. The first selector selects one of the outputs of the first through fourth predecoders and outputs it to the first fixed-length instruction decode unit. The second selector selects one of the outputs of the first through fourth predecoders and outputs it to the second fixed-length instruction decode unit.

In the second mode, a first prefix corresponding to part of a first variable-length instruction, a third fixed-length instruction corresponding to part of the first variable-length instruction, a second prefix corresponding to part of a second variable-length instruction, or a fourth fixed-length instruction corresponding to part of the second variable-length instruction is inputted to the first predecoder. A first prefix corresponding to part of the first variable-length instruction, a third fixed-length instruction corresponding to part of the first variable-length instruction, a second prefix corresponding to part of the second variable-length instruction, or a fourth fixed-length instruction corresponding to part of the second variable-length instruction is inputted to the second predecoder. A first prefix corresponding to part of the first variable-length instruction, a third fixed-length instruction corresponding to part of the first variable-length instruction, a second prefix corresponding to part of the second variable-length instruction, or a fourth fixed-length instruction corresponding to part of the second variable-length instruction is inputted to the third predecoder. A first prefix corresponding to part of the first variable-length instruction, a third fixed-length instruction corresponding to part of the first variable-length instruction, a second prefix corresponding to part of the second variable-length instruction, or a fourth fixed-length instruction corresponding to part of the second variable-length instruction is inputted to the fourth predecoder. The first predecoder predecodes the first prefix, the third fixed-length instruction, the second prefix or the fourth fixed-length instruction. The second predecoder predecodes the first prefix, the third fixed-length instruction, the second prefix or the fourth fixed-length instruction. The third predecoder predecodes the first prefix, the third fixed-length instruction, the second prefix or the fourth fixed-length instruction. The fourth predecoder predecodes the first prefix, the third fixed-length instruction, the second prefix or the fourth fixed-length instruction. The third selector or the fourth selector selects one of the output of the first predecoder, the output of the second predecoder, the output of the third predecoder or the output of the fourth predecoder and outputs it to the first prefix code decode unit or the second prefix code decode unit. The first selector or the second selector selects one of the outputs of the first through fourth predecoders and outputs it to the first fixed-length instruction decode unit or the second fixed-length instruction decode unit.

[2] The data processor described in the paragraph [1] cuts off the supply of power to the first and second prefix code decode units in the first mode.

[3] The data processor described in the paragraph [1] outputs an instruction attribute signal indicative of whether the input instruction is a fixed-length instruction in the first mode, a fixed-length instruction corresponding to part of a variable-length instruction in the second mode or a prefix corresponding to part of the variable-length instruction in the second mode, to each of the first, second, third and fourth predecoders.

[4] The data processor described in the paragraph [1] further comprises mode registers for performing the setting of stopping the operations of the first and second prefix code decode units or invalidating the first and second prefix code decode units in the first mode.

[5] A data processor according to another embodiment of the present invention comprises, as an executable instruction set, a first instruction comprised of an instruction code having a first code length, and a second instruction having a second code length, in which the instruction code to be followed up is modified with a prefix code. The data processor comprises instruction register units (IREG0 through IREG3) which respectively fetch instructions with a plurality of the instructions as units; predecoders (FPD0 through FPD3) which respectively decode the plurality of instructions fetched into the instruction register units and determine whether the instructions respectively correspond to an instruction code of the first instruction, an instruction code of the second instruction or a prefix code of the second instruction; first decoders (BDYDEC1 and BDYDEC2) which respectively decode the instruction codes of the instructions fetched into the instruction register units; second decoders (PRFDEC1 and PRFDEC2) which respectively decode the prefix codes of the instructions fetched into the instruction register units; and selectors (SEL0 through SEL3 and SELA through SELD) which supply the instruction codes to the first decoders and supply the prefix codes to the second decoders, based on the results of determination (A0 through A3) by the predecoders, respectively. The selectors respectively supply the instruction codes to the first decoders with respect to the first instruction and supply the prefix codes to the second decoders with respect to the second instruction, followed by supply of the instruction codes modified with the prefix codes to the first decoders.

According to the above, in order to decode the instruction with the prefix, the decoders each corresponding to the prefix-free instruction are left as they are, and the decoders each corresponding to the prefix code are added, thus making it possible to eliminate an influence exerted on the execution of the existing fixed-length instruction. The prefix code is supplied to its corresponding decoder before the fixed-length instruction code modified with the prefix code, thereby making it possible to modify the operation of decoding the fixed-length instruction according to the result of decoding of each prefix code.

[6] When a pair of the first decoder and the second decoder is provided depending on the number of pipelines to execute instructions by a plurality of the pipelines (Pipe1 and Pipe2) in the data processor described in the paragraph [5], the selectors respectively perform control for supplying the instruction and prefix codes configuring the second instruction to the first and second decoders of the same pipeline, based on the results of determination by the predecoders. Since the prefix code modifies the following fixed-length instruction code, the issue of an efficient super-scalar instruction is enabled at the instruction set containing the prefixed instruction by the instruction code following the prefix code being supplied to each decoder of the same pipeline as the decoder for the prefix code.

[7] In the data processor described in the paragraph [5], the second instruction decoders cut off the supply of operating power or give instructions for deactivation of circuit operations in a first mode for executing only the first instruction. It is thus possible to suppress power consumption by the data processor. When the prefix codes are unnecessary in development of a wide variety of products, the area and power consumption of the data processor can be reduced by eliminating the decoders for the prefix codes in its logic synthesis by the decoders being divided between the instruction and prefix codes.

[8] In the data processor described in the paragraph [5], the predecoders respectively output attribute signals (A0 through A3) each indicating whether the instruction code is the instruction code of the first instruction, the instruction code of the second instruction or the prefix code of the second instruction. Using the attribute signals enables the selectors to easily perform control on the destination of supply of the instruction and prefix codes.

[9] The data processor described in the paragraph [5] comprises mode registers (MR1 and MR2) each of which designates the first mode for executing only the first instruction or the second mode for executing both of the first and second instructions. It is possible to perform switching between the operation modes dynamically.

[10] A data processor according to a further embodiment of the present invention comprises, as an executable instruction set, a first instruction comprised of a first instruction code having a first code length, a second instruction having a second code length, in which the first instruction code to be followed up is modified with a prefix code, and a third instruction comprised of a second instruction code having a second code length. The data processor comprises instruction register units (IREG0 through IREG3) which respectively fetch instructions with a plurality of the instructions as units; predecoders (FPD0 through FPD3) which respectively decode the plurality of instructions fetched into the instruction register units and determine whether the instructions respectively correspond to a first instruction code of the first instruction, a first instruction code of the second instruction, a prefix code of the second instruction, or a second instruction code of the third instruction; first decoders (BDYDEC1 and BDYDEC2) which respectively decode the first instruction codes fetched into the instruction register units; second decoders (PREDEC1 and PREDEC2) which respectively decode the prefix codes of the second instructions fetched into the instruction register units; third decoders (32UDEC and 32LDEC) which respectively decode the second instruction codes fetched into the instruction register units; and selectors (SEL0 through SEL3 and SELA through SELD) which respectively supply the first instruction codes to the first decoders, supply the prefix codes to the second decoders and supply the second instruction codes to the third decoders, based on the results of determination (A0 through A3) by the predecoders. Each of the selectors supplies the first instruction code to each of the first decoders with respect to the first instruction and supplies the prefix code to each of the second decoders with respect to the second instruction. Thereafter, the selector supplies the first instruction code modified with the prefix code to each of the first decoders and supplies the second instruction code to each of the third decoders with respect to the third instruction.

Even if the third instruction used as a native instruction for the second instruction exists in mixed form, an operative effect similar to the paragraph [5] is brought about correspondingly.

[11] In the data processor described in the paragraph [10], the pair of the first and second decoders is provided depending on the number of pipelines to execute instructions by a plurality of the pipelines (Pipe1 and Pipe2). The selectors respectively perform control for supplying the first instruction and prefix codes corresponding thereto, configuring the second instruction to the first and second decoders of the same pipeline, based on the results of determination by the predecoders.

[12] In the data processor described in the paragraph [10], the second and third instruction decoders cut off the supply of operating power or give instructions for deactivation of circuit operations in an operation mode for executing only the first instruction. The third instruction decoders cut off the supply of the operating power or give instructions for deactivation of the circuit operations in an operation mode for executing only the first and second instructions.

[13] In the data processor described in the paragraph [10], the predecoders respectively output attribute signals (A0 through A3) each indicating whether the input instruction code corresponds to the first instruction code of the first instruction, the first instruction code of the second instruction, the prefix code of the second instruction or the second instruction code of the third instruction.

[14] The data processor described in the paragraph [10] further comprises mode registers each of which designates a first mode for executing only the first instruction, a second mode for executing both of the first and second instructions or a third mode for executing all of the first through third instructions.

2. Further Detailed Description of the Preferred Embodiments

Embodiments will further be described in detail.

First Embodiment

A description will first be made of a data processor including, as an executable instruction set, a first instruction (fixed-length instruction) comprised of a first instruction code (fixed-length instruction code) of a first code length, e.g., 16 bits, and a second instruction (variable-length instruction, variable-length instruction with a prefix) of a second code length (32 bits) in which the first instruction code to be followed up is modified with a prefix code (e.g., 16 bits). A variable-length instruction decode unit adaptable to both the first and second instructions will be described in particular herein. To describe schematically, a variable-length decode unit is added to the existing fixed-length instruction decode unit and thereby the variable-length instruction decode unit is operated as needed to configure an instruction decode unit in a manner to be capable of executing an instruction with a prefix. There is thus no influence on the execution of the existing fixed-length instruction. It is possible to stop the operation of only the variable-length instruction decode unit corresponding to part of decode logic during execution of the fixed-length instruction. This contributes to low power consumption of the data processor. Further, when the variable-length instruction is not necessary, it also becomes easy to eliminate the variable-length instruction decode unit in logic synthesis of the instruction decode unit. The present embodiment will be explained in detail below.

FIG. 1 illustrates an instruction fetch unit FTC and an instruction decode unit DEC in a data processor capable of executing a variable-length instruction using each prefix code.

Although not limited in particular, the instruction fetch unit FTC has four instruction registers IREG0 through IREG3 which are respectively 16 bits. Codes fetched into the instruction registers IREG0 through IREG3 are represented as I0 through I3 for the sake of convenience. Instructions are respectively fetched into the instruction registers IREG0 through IREG3 in instruction fetch cycle units in accordance with the operation of unillustrated instruction fetch control logic. Although not limited in particular, instruction fetches for the instruction registers IREG0 through IREG3 may be comprised of fixed-length and variable-length instructions in mixed form to facilitate the understanding thereof, but the variable-length instruction is assumed to have to be completed continuously within the corresponding 64 bits. In brief, one variable-length instruction of 32 bits should be placed immediately before a 16-bit instruction code to be modified to a prefix code and allowed to exist in the instruction registers IREG0 through IREG3 fetched at one time. Accordingly, no prefix code is fetched into the register IREG3. The instruction fetch unit FTC outputs attribute signals A0 through A3 indicative of the attributes of the codes I0 through I3 and selection signals S0 through S3 to the instruction decode unit DEC along with the codes I0 through I3. The attribute signals A0 through A3 and the selection signals S0 through S3 will be explained along with the instruction decode unit DEC.

The instruction decode unit DEC has predecoders DPD0 through DPD3 for every code of I0 through I3. The predecoders DPD0 through DPD3 respectively have predecode logic PRDEC and distribution circuits DSB for the attribute signals A0 through A3. Although not limited in particular, the predecoders DPD0 through DPD3 respectively determine based on the attribute signals (A0 through A3) from the predecoders (FPD0 through FPD3) in the instruction fetch unit (FTC) whether an input instruction is of the fixed-length instruction having the first code length, the fixed-length instruction corresponding to part of the variable-length instruction having the second code length or the prefix corresponding to part of the variable-length instruction having the second code length, and perform, in advance, partial decoding on a 16-bit instruction code placed under strict timing restrictions in execution of a fixed-length 16-bit instruction, and a prefix code placed under strict timing restrictions in execution of a prefixed instruction. In predecoding of the prefix code, a prefix code of a specific type (e.g., where a fixed register is substituted with another register or immediate) of the prefixed instruction is decoded, and a control signal and the like required for execution of the prefixed instruction are generated in advance by each predecoder.

The outputs of the predecoders DPD0 through DPD3 and the attribute information pieces A0 through A3 corresponding thereto are decoded and executed by decoders to be next described. Fixed-length instruction decoders BDYDEC1 and BDYDEC2 each of which decodes the fixed-length instruction code, and prefix decoders PRFDEC1 and PRFDEC2 each of which decodes the prefix code, are separately provided in the instruction decode unit DEC. The data processor to be described herein is configured as a 2-way superscalar processor which executes instructions by two pipelines Pipe1 and Pipe2. The fixed-length instruction decoder BDYDEC1 and the prefix decoder PRFDEC1 correspond to the pipeline Pipe1, whereas the fixed-length instruction decoder BDYDEC2 and the prefix decoder PRFDEC2 correspond to the pipeline Pipe2. DB1 and DB3, and DB0 and DB2 disposed in stages prior to the fixed-length instruction decoders BDYDEC1 and BDYDEC2 and the prefix decoders PRFDEC1 and PRFDEC2 are respectively configured as buffers which receive the outputs of the predecoders DPD0 through DPD3 and the attribute information pieces A0 through A3 corresponding thereto. It is convenient to understand that they are input buffers for decoders or output buffers for selectors. Incidentally, objects to be decoded inputted to the decoders PRFDEC1, BDYDEC1, PRFDEC2 and BDYDEC2 are respectively illustrated as Ih through Ik for convenience, and the attribute information pieces are respectively illustrated as Ah through Ak for convenience.

Selectors SEL0 through SEL3 and SELA through SELD are respectively disposed between the predecoders DPD0 through DPD3 and the decoders PRFDEC1, BDYDEC1, PRFDEC2 and BDYDEC2. The selectors SEL0 through SEL3 and SELA through SELD respectively decide the correspondences between the codes Ih, Ii, Ij and Ik and codes I0, I1, I2 and I3 and decide the correspondences between the attribute signals Ah, Ai, Aj and Ak and attribute signals A0, A1, A2 and A3. The state of selection by each of the selectors SEL0 and SELA is determined by the selection signal S0, the state of selection by each of the selectors SEL1 and SELB is determined by the selection signal S1, the state of selection by each of the selectors SEL2 and SELC is determined by the selection signal S2, and the state of selection by each of the selectors SEL3 and SELD is determined by the selection signal S3, respectively.

Figures 2, 3:
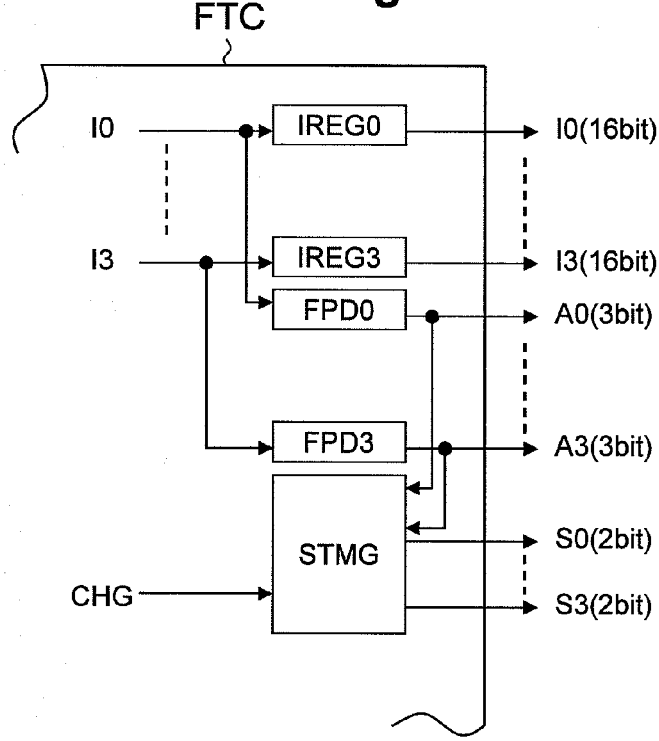
FIG. 2 is a block diagram schematically showing a configuration for generating attribute and selection signals at the instruction fetch unit FTC.
FIG. 3 is an explanatory diagram illustrating the form of generation of selection signals by a selection control circuit.

FIG. 2 schematically shows a configuration in which the attribute signals A0 through A3 and the selection signals S0 through S3 at the instruction fetch unit FTC are generated. The attribute signals A0 through A3 are generated by the predecoders FPD0 through FPD3 which respectively predecode the codes I0 through I3 in 16-bit units. The predecoders FPD0 through FPD3 respectively determine whether the input 16-bit codes I0 through I3 respectively correspond to a 16-bit fixed-length instruction code, a 16-bit prefix code or a 32-bit native instruction (variable-length instruction code corresponding to a non-prefix code), and output the attribute signals A0 through A3 of codes corresponding to the result of determination. Although not limited in particular, when the input instruction code is of the fixed-length instruction code, a bit pattern (e.g., 3' b001) indicative of a fixed-length instruction code is outputted. Similarly, when the instruction code is of the prefix code, a bit pattern (e.g., 3' b100) indicative of a prefix code is outputted. When the instruction code is of the variable-length instruction code corresponding to the non-prefix code, a bit pattern (e.g., 3' b010) indicative of a non-prefix 32-bit instruction code is outputted.

Although not limited in particular, the selection signals S0 through S3 are generated by a selection control circuit STMG based on the attribute signals A0 through A3 and another control signal CHG.

The form of generation of the selection signals S0 through S3 by the selection control circuit STMG is illustrated in FIG. 3. Assuming that an instruction execution cycle at each pipeline for the 2-way superscalar is one cycle and instructions fetched into the instruction registers IREG0 through IREG3 are executed in two-cycle units, the decoders BDYDEC1 and PRFDEC1 of the pipeline Pipe1 and the decoders BDYDEC2 and PRFDEC2 of the pipeline Pipe2 respectively input codes one by one in one-cycle units and perform decoding thereon. Assume here that only a 16-bit fixed-length instruction or a 32-bit variable-length instruction using a prefix is executed. Therefore, according to the conditions for the instruction fetches of the instruction registers IREG0 through IREG3, the fetch's form is given as five forms of A through E, and the instruction codes and the attribute information are sequentially supplied to their corresponding decoders selected by the selectors in cycles CYC1 and CYC2 in accordance with the fetch's form. The cycles CYC1 and CYC2 respectively means one cycle of the instruction execution cycle. In the representation of FIG. 3 described above, I16 of I16(*x*) means the fixed-length instruction code, and (x) means that the code is stored in its corresponding instruction register IREGx. Iprf of Iprf(x) means that it is of a prefix code, and (x) is similar to the above. As illustrated in each of the forms B, C, D and E, a prefix code is first supplied to the prefix decoder PRFDEC1 or PRFDEC2 with respect to the 32-bit variable-length instruction using the prefix code, and an instruction code modified with the prefix code is thereafter supplied to the instruction decoder BDYDEC1 or BDYDEC2 of its corresponding pipeline. According to it, in order to decode the prefixed instruction, the decoders each corresponding to the prefix-free instruction are left as they are, and the decoders each corresponding to the prefix code are added, thus making it possible to eliminate an influence exerted on the execution of the existing fixed-length instruction. The prefix code is supplied to its corresponding decoder before the fixed-length instruction code modified with the prefix code, thereby making it possible to modify the operation of decoding the fixed-length instruction according to the result of decoding of each prefix code.

The control signal CHG is used for switching between the instruction supplied to the pipeline Pipe1 and the instruction supplied to the pipeline Pipe2, for example. In the form A, for example, I16(0) and I16(1), and I16(2) and I16(3) can be designated by the control signal CHG so as to take the pipeline Pipe2 and the pipeline Pipe1 respectively. It is needless to say that the selection control circuit STMG is disposed in the fetch unit FTC for convenience but may be placed in the decode unit DEC or the like.

The instruction decoders PRFDEC1, BDYDEC1, PRFDEC2 and BDYDEC2 respectively recognize the type of input codes by receiving the attribute information pieces Ah through Ak and thereby enable decode operations. For example, the prefix decoders PRFDEC1 and PRFDEC2 stop their operations where the input code being of the prefix coded is not notified thereto by Ah and Aj. Thus, when the frequency of use of the instruction with the prefix is low, the input of a clock is stopped in nonuse of the variable-length instruction using the prefix, thereby making it possible to suppress power consumption. Further, the accuracy of control is enhanced and the on/off of the variable-length instruction decode unit is dynamically controlled, whereby it is also possible to perform optimization of power consumption. The instruction decoders BDYDEC1 and BDYDEC2 also similarly perform low power consumption control similar to the above using the attribute information pieces Ai and Ak.

Figure 4:
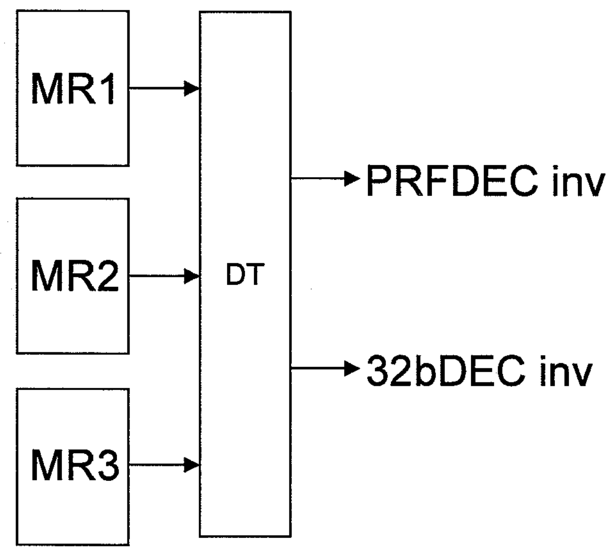
FIG. 4 is a block diagram illustrating, as an operation mode control unit lying in the data processor, a configuration of mode control logic for controlling switching between a fixed-length instruction operation mode and a variable-length instruction operation mode.

A configuration of mode control logic for controlling switching between a fixed-length instruction operation mode and a variable-length instruction operation mode is illustrated as an operation mode control unit in the data processor in FIG. 4. This logic has three mode registers MR1 through MR3 and is provided with a detector DT which inputs the outputs of the mode registers MR1 through MR3 therein and detects the set operation mode. The mode registers MR1 through MR3 respectively indicate the type of operation mode for the data processor and controls the following three modes in the example of FIG. 4. MR1 is a mode register which designates an operation mode in which only the fixed-length instruction can be carried out, MR2 is a mode register which designates an operation mode in which the fixed-length instruction and the instruction with the prefix can be carried out, and MR3 is a mode register which designates an operation mode in which the fixed-length instruction, the prefixed instruction and the non-prefix variable-length instruction can be carried out. Only one of the mode registers MR1 through MR3 might be set or a plurality of mode registers might be set. When the plurality of mode registers are set, the detector DT needs to decide the selection of each mode. For example, there is a case in which a mode register small in mode register number is selected, or there is a case in which a mode register large in mode register number in reverse is selected.

A description will be made of a case in which the mode registers MR1 through MR3 are set. Assume where only one of the mode registers is set. When the mode register MR1 is set, an operation mode is selected in which only the fixed-length instruction can be carried out. At this time, a prefix invalid signal PRFDECinv and a native instruction invalid signal 32*b*DECinv are both enabled and outputted from the detector DT. When the mode register MR2 is set, a mode is selected in which the fixed-length instruction and the instruction with the prefix can be carried out. At this time, 32*b*DECinv is outputted as being enabled from the detector DT. When the mode register MR3 is set, a mode is selected in which the fixed-length instruction, the instruction with the prefix and the non-prefix variable-length instruction can be carried out. At this time, the detector DT invalidates both the prefix invalid signal PRFDECinv and the native instruction invalid signal 32*b*DECinv. The signal PRFDECinv is a signal for stopping the operations of the prefix decoders PRFDEC1 and PRFDEC2 or invalidating the operations of the prefix decoders PRFDEC1 and PRFDEC2. When the signal PRFDECinv is made valid, the input of a clock to each of the prefix decoders PRFDEC1 and PRFDEC2 is stopped or the input of operating power is cut off. Although this has no bearing on the configuration of FIG. 1 in particular (this has a bearing on the configurations of FIGS. 9, 12, 13 and 14 to be described later), 32*b*DECinv is a signal which stops the operation of the variable-length instruction code decode unit for the non-prefix code or invalidates it. When the signal 32*b*DECinv is made valid, the variable-length instruction code decode unit for the non-prefix code stops the input clock and stops operating or cuts off the supply of power to the variable-length instruction code decode unit for the non-prefix code. Owing to these operations, power consumption of the data processor can further be suppressed in addition to the low power consumption based on the attribute signals.

Figure 5:
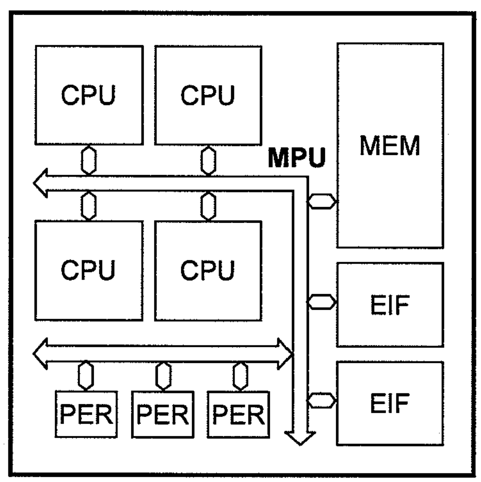
FIG. 5 is a block diagram illustrating an overall configuration of a data processor which adopts the instruction decode unit shown in FIG. 1.

An overall configuration of a data processing which has adopted the instruction decode unit is illustrated in FIG. 5. The data processor MPU includes one or plural memories MEM, external interface circuits EIF and internal peripheral modules PER or the like coupled to a plurality of processor cores CPU by an internal bus, centering around the plurality of processor cores CPU. Although not limited in particular, the data processor MPU is formed in one semiconductor substrate like monocrystalline silicon by a complementary MOS integrated circuit manufacturing technique or the like. Each of the processor cores CPU adopts the above instruction decode unit and realizes a required program processing function by fetching each instruction and executing it.

Second Embodiment

Figure 6:
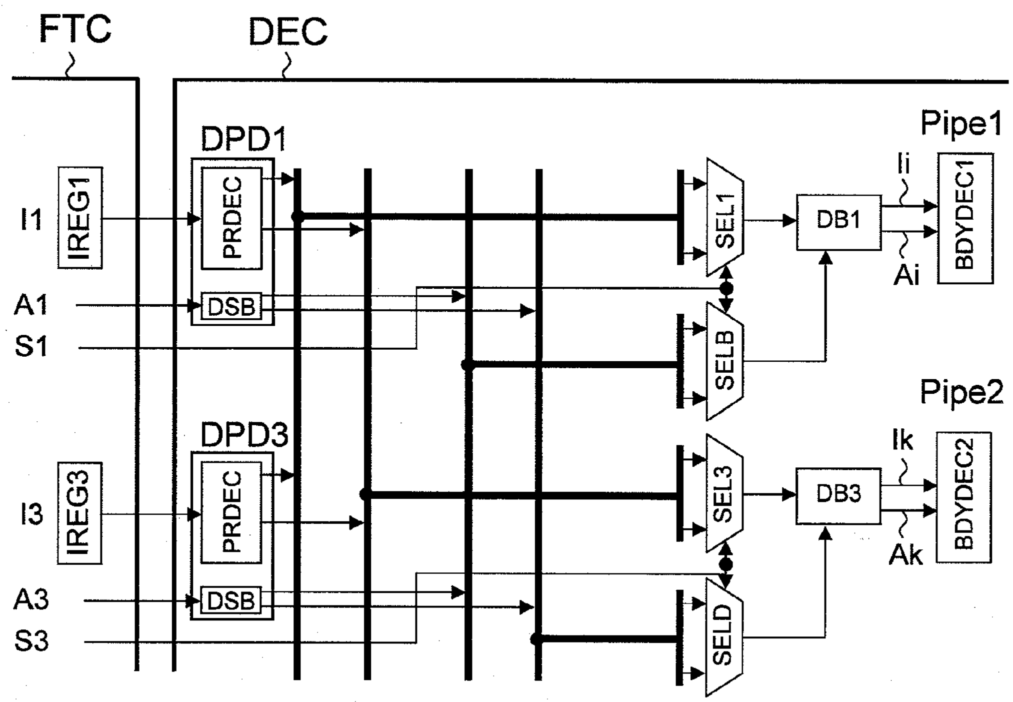
FIG. 6 is a block diagram of a second embodiment illustrating an example of another instruction fetch unit where the function thereof is reduced with respect to the data processor of FIG. 1 in its logic synthesis.

FIG. 6 shows an example illustrative of an instruction fetch unit and an instruction decode unit where the functions thereof are reduced with respect to the data processor of FIG. 1 in its logic synthesis. FIG. 6 is different from FIG. 1 in that the configuration for decoding the prefix decode is omitted and the number of the instruction registers in the instruction fetch unit is reduced to two. For example, a fetch unit and an instruction decode unit at which only fixed-length instruction decode units are synthesized or combined, are configured in a data processor in which, in logic synthesis of the data processor, an option description related town RTL (Register Transfer Logic) description, e.g., such an option description that when an instruction set other than a fixed-length instruction is not necessary, logic other than the fixed-length instruction decode units is not synthesized and the number of instruction registers is reduced in half is performed thereby to use only a fixed-length instruction set. This example is shown in FIG. 6.

The configuration of FIG. 6 is included in the data processor in which only the fixed-length instructions exist. Unnecessary decode logic is deleted and decoders in the decode unit are respectively comprised of two fixed-length instruction decoders BDYDEC1 and BDYDEC2, predecoders DPD1 and DPD3 and selectors SEL1, SELB, SEL3 and SELD. The instruction fetch unit includes instruction registers IREG1 and IREG3 and has the function of generating attribute signals A1 and A3 and select signals S1 and S3. In this case, a timing control circuit STMG may adopt a selective form for supplying I16(1) to the fixed-length instruction decoder BDYDEC1 and supplying I16(3) to the fixed-length instruction decoder BDYDEC2 or a selective form for supplying I16(1) to the fixed-length instruction decoder BDYDEC2 and supplying I16(3) to the fixed-length instruction decoder BDYDEC1. Whether either thereof should be selected may be controlled by a control signal CHG. Since the present embodiment is similar to the first embodiment in other respects, their detailed description is omitted.

Third Embodiment

Figure 7:
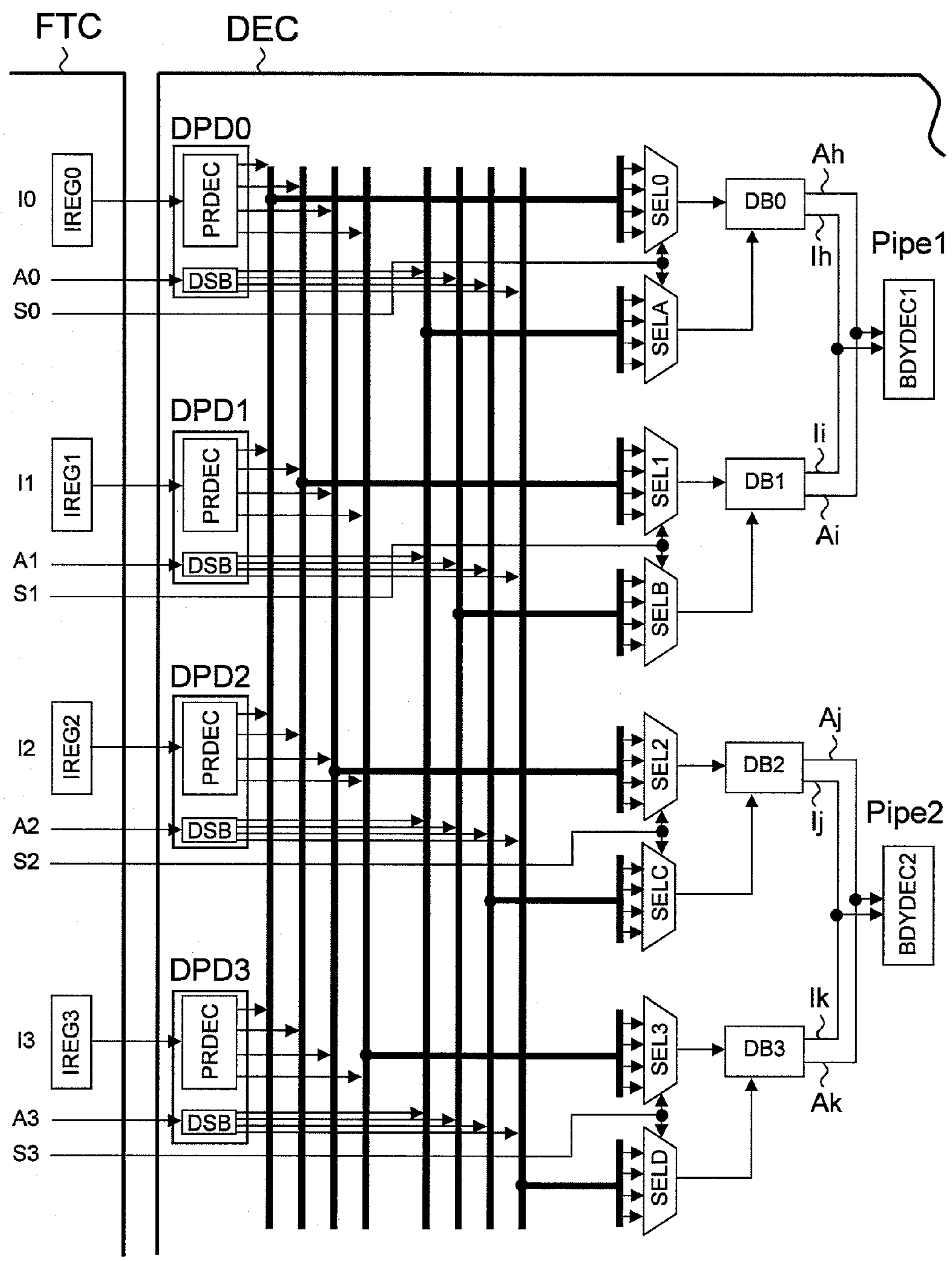
FIG. 7 is a block diagram of a third embodiment showing an example of a further instruction fetch unit where the function thereof is reduced with respect to the data processor of FIG. 1 in its logic synthesis.

FIG. 7 shows an example illustrative of another instruction fetch unit and another instruction decode unit where their functions are reduced with respect to the data processor of FIG. 1 in its logic synthesis. FIG. 7 is different from FIG. 1 in that only a fixed-length instruction can be carried out and the scale of instruction registers is made equal to that in FIG. 1. For example, a fetch unit and an instruction decode unit at which only fixed-length instruction decode units are synthesized or combined, are configured in a data processor in which, in logic synthesis of the data processor, an option description related to an RTL (Register Transfer Logic) description, e.g., such an option description that when an instruction set other than fixed-length instructions is unnecessary, logic other than the fixed-length instruction decode units is not synthesized is performed thereby to use only a fixed-length instruction set. This example is shown in FIG. 7.

The configuration of FIG. 7 is included in the data processor in which only the fixed-length instructions exist. Unnecessary decode logic is deleted and decoders in the decode unit are configured as two fixed-length instruction decoders BDYDEC1 and BDYDEC2. Predecoders DPD0 through DPD3 and selectors SEL0 through SEL3, SELA through SELD are left they are. Outputs of DB0 and DB1 are commonly coupled to the input of the decoder BDYDEC1, and outputs of DB2 and DB3 are commonly coupled to the input of the decoder BDYDEC2. In this case, a timing control circuit STMG may realize the form of A in FIG. 3. It is needless to say that pipelines for supplying instructions using a control signal CHG in a manner similar to the above may be controlled contrary to it. Incidentally, according to the option description or the like at logic synthesis, each of DB0 through DB3 is added with the function of controlling the output of each of an instruction code and attribute information to a high impedance state when a code indicative of being a fixed-length instruction code is not inputted thereto. Since the present embodiment is similar to the first embodiment in other respects, their detailed description is omitted.

Fourth Embodiment

Figure 8:
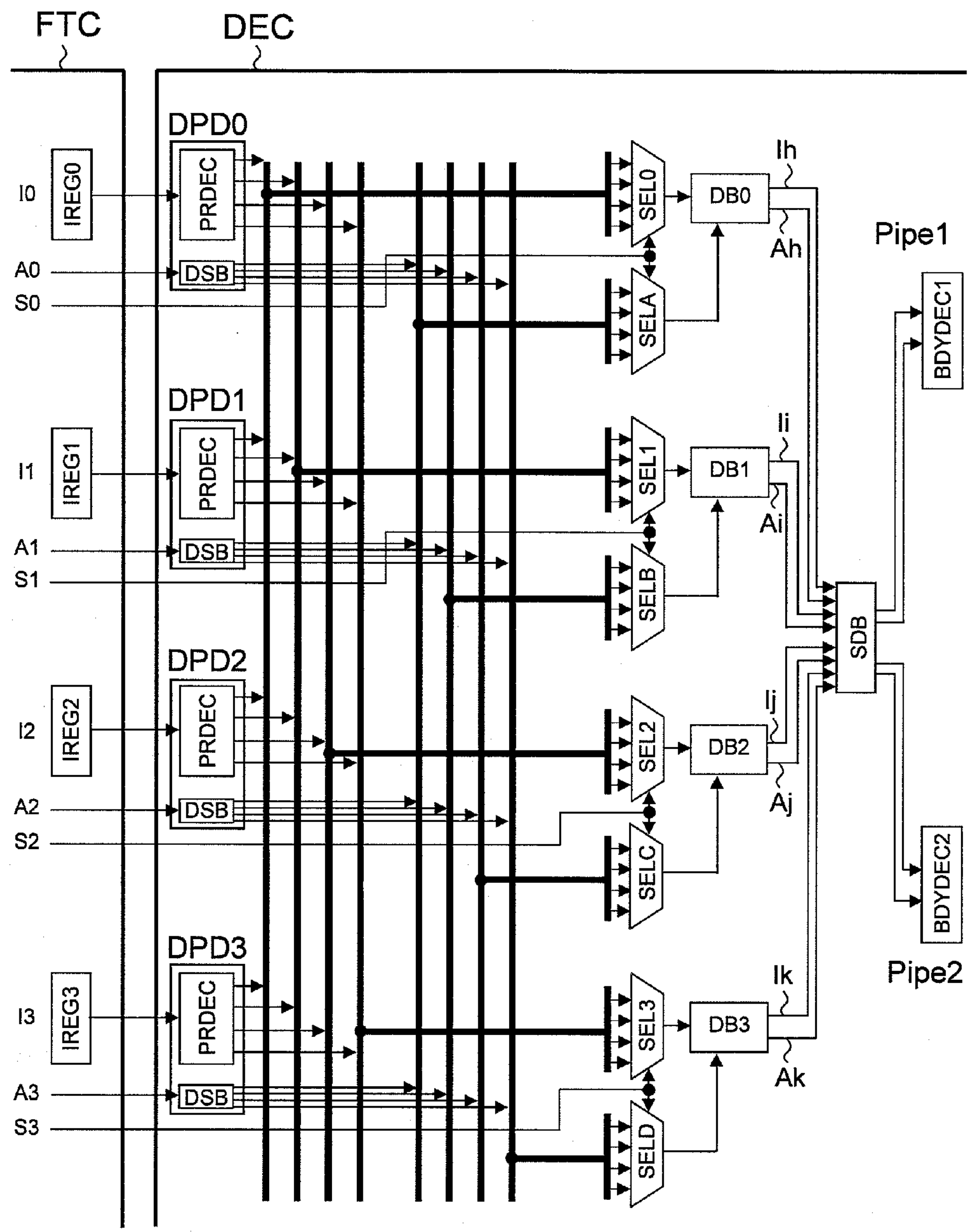
FIG. 8 is a block diagram of a fourth embodiment showing an example of yet another instruction fetch unit where the function thereof is reduced with respect to the data processor of FIG. 1 in its logic synthesis.

FIG. 8 shows an example illustrative of yet another instruction fetch unit and another instruction decode unit where the functions thereof are reduced with respect to the data processor of FIG. 1 in its logic synthesis. FIG. 8 is different from FIG. 1 in that only each fixed-length instruction can be executed, an instruction distribution circuit SDB is disposed between DB0 through DB3 and instruction decoders BDYDEC1 and BDYDEC2, and the scale of instruction registers is equal to that in FIG. 1. The configuration of FIG. 8 is realized by an option description or the like related to an RTL (Register Transfer Logic) description in logic synthesis of the data processor in a manner similar to the above.

The configuration of FIG. 8 is included in the data processor in which only the fixed-length instructions exist. Unnecessary decode logic is deleted and decoders in the decode unit are configured as two fixed-length instruction decoders BDYDEC1 and BDYDEC2. Predecoders DPD0 through DPD3 and selectors SEL0 through SEL3, and SELA through SELD are left they are. Outputs of DB0, DB1, DB2 and DB3 are commonly coupled to the inputs of the decoders BDYDEC1 and BDYDEC2 respectively. In this case, a timing control circuit STMG may realize the form of A in FIG. 3. In this case, there is no need to perform high impedance control on DB0 through DB3. An instruction distribution circuit SDB may perform instruction distribution control conforming to the form A of FIG. 3 in accordance with a synchronous clock for instruction execution. In brief, the instruction distribution circuit SDB may be configured in such a way that selection signals S0 through S3 are supplied thereto and instead outputs of the predecoders DPD0 through DPD3 are directly supplied thereto. In logic synthesis, its instruction may be performed by the RTL's option description in a manner similar to the above. It is needless to say that pipelines for supplying instructions using a control signal CHG in a manner similar to the above may be controlled contrary to it. Since the present embodiment is similar to the first embodiment in other respects, their detailed description is omitted.

Fifth Embodiment

A description will next be made of a data processor including, as an executable instruction set, a first instruction (fixed-length instruction) comprised of a first instruction code (fixed-length instruction code) of a first code length, e.g., 16 bits, a second instruction (variable-length instruction with a prefix) of a second code length (32 bits) in which the first instruction code to be followed up is modified with a prefix code (e.g., 16 bits), and a third instruction (non-prefix variable-length instruction, 32-bit native instruction) comprised of a second instruction code of a second code length. Each variable-length instruction decode unit adaptable to each of the first, second and third instructions will be described in particular herein. To describe schematically, a variable-length decode unit with a prefix and a non-prefix variable-length decode unit are added to the existing 16-bit fixed-length instruction decode unit, and thereby the variable-length instruction decode unit with the prefix or the non-prefix variable-length instruction decode unit is operated as needed to configure an instruction decode unit in a manner to be capable of executing a prefixed instruction and a non-prefix variable-length instruction. There is thus no influence on the execution of the existing fixed-length instruction. It is possible to stop the operations of the prefix variable-length instruction decode unit and non-prefix variable-length instruction decode unit corresponding to part of decode logic during execution of the fixed-length instruction. This contributes to low power consumption of the data processor. Further, when the prefix variable-length instruction or the non-prefix variable-length instruction is unnecessary, it also becomes easy to eliminate the variable-length instruction decode units corresponding to those in logic synthesis of the instruction decode unit. The present embodiment will be explained in detail below.

Figure 9:
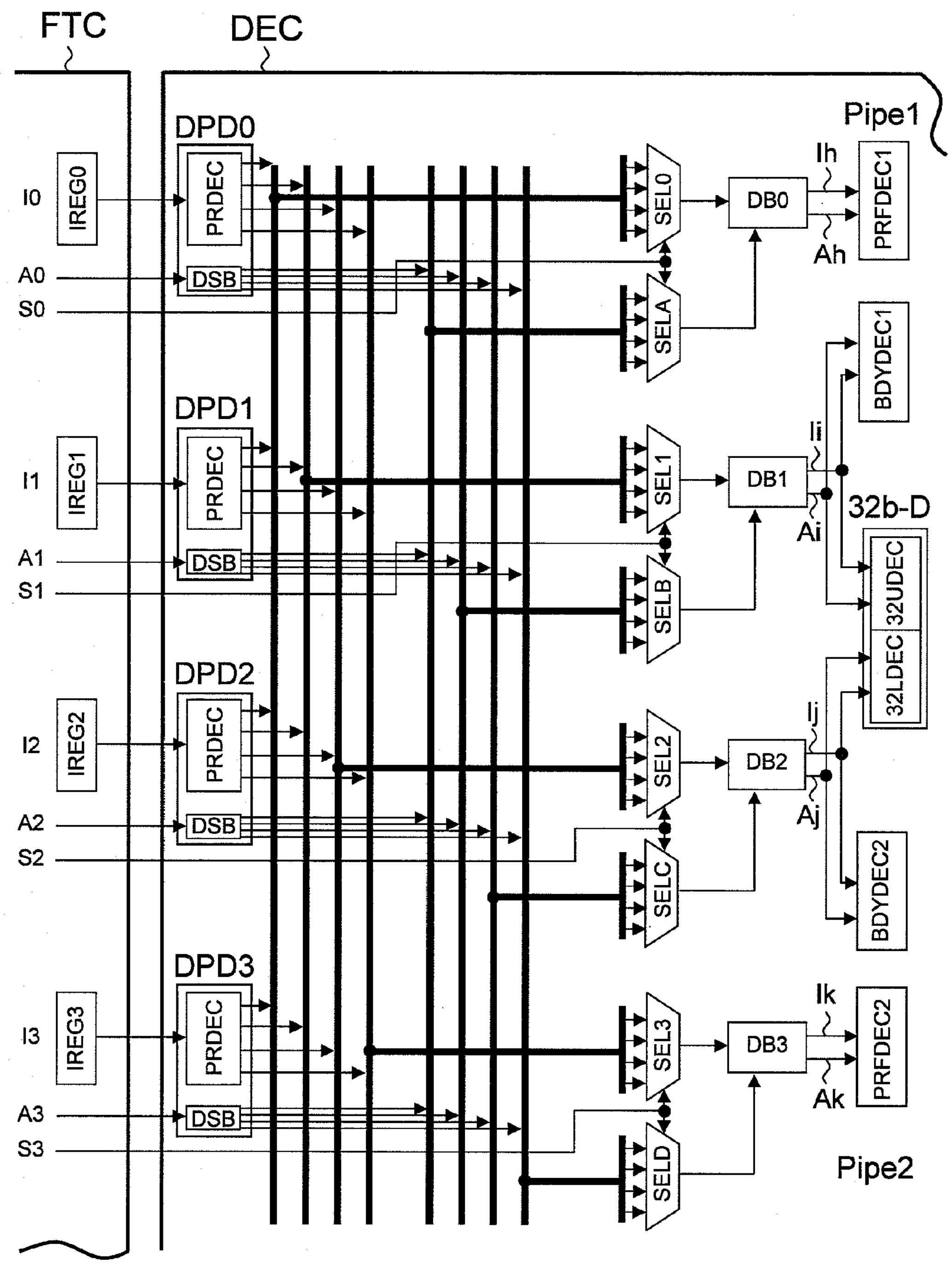
FIG. 9 is a block diagram of a fifth embodiment illustrating an instruction fetch unit and an instruction decode unit in a data processor capable of executing a variable-length instruction with a prefix and a non-prefix variable-length instruction in addition to a 16-bit fixed-length instruction.

FIG. 9 illustrates an instruction fetch unit FTCE and an instruction decode unit DECE in a data processor capable of executing a variable-length instruction with a prefix and a non-prefix variable-length instruction in addition to the 16-bit fixed-length instruction.

Although not limited in particular, the instruction fetch unit FTCE has four instruction registers IREG0 through IREG3 which are respectively 16 bits. Codes fetched into the instruction registers IREG0 through IREG3 are respectively represented as I0 through I3 for the sake of convenience. Instructions are respectively fetched into the instruction registers IREG0 through IREG3 in instruction fetch cycle units in accordance with the operation of unillustrated instruction fetch control logic. Although not limited in particular, instruction fetches for the instruction registers IREG0 through IREG3 may be comprised of a 16-bit fixed-length instruction, a variable-length instruction with a prefix and a non-prefix variable-length instruction in mixed form to facilitate the understanding thereof, but the variable-length instruction is assumed to have to be completed continuously within the corresponding 64 bits. In brief, one variable-length instruction of 32 bits should be placed immediately before a 16-bit instruction code to be modified relative to a prefix code and allowed to exist in the instruction registers IREG0 through IREG3 fetched at one time. Accordingly, no prefix code is fetched into the instruction register IREG3. The non-prefix variable-length instruction is also similar to the above. The instruction fetch unit FTCE outputs attribute signals A0 through A3 indicative of the attributes of the codes I0 through I3 and selection signals S0 through S3 to the instruction decode unit DEC along with the codes I0 through I3. The attribute signals A0 through A3 and the selection signals S0 through S3 will be explained along with the instruction decode unit DECE.

The instruction decode unit DECE has predecoders DPD0 through DPD3 for every code of I0 through I3. The predecoders DPD0 through DPD3 respectively have predecode logic PRDEC and distribution circuits DSB for the attribute signals A0 through A3. Although not limited in particular, the predecoders DPD0 through DPD3 respectively determine based on the attribute signals (A0 through A3) from the predecoders in the instruction fetch unit (FTCE) whether an input instruction is of the fixed-length instruction of the first code length, the fixed-length instruction corresponding to part of the variable-length instruction of the second code length or the prefix corresponding to part of the variable-length instruction of the second code length, and perform, in advance, partial decoding on a 16-bit fixed-length instruction placed under strict timing restrictions in execution of the 16-bit fixed-length instruction, a 32-bit non-prefix variable-length instruction placed under strict timing restrictions in execution of the 32-bit non-prefix variable-length instruction, and a variable-length instruction with a prefix placed under strict timing restrictions in execution of the variable-length instruction with the prefix. In predecoding of each prefix code, a prefix code of a specific type (e.g., where a fixed register is substituted with another register or immediate) of the instruction with the prefix is decoded, and a control signal and the like required for execution of the instruction with the prefix are generated in advance by each predecoder.

The outputs of the predecoders DPD0 through DPD3 and the attribute information pieces A0 through A3 corresponding thereto are decoded and processed by decoders. Fixed-length instruction decoders BDYDEC1 and BDYDEC2 each of which decodes a 16-bit fixed-length instruction code, prefix decoders PRFDEC1 and PRFDEC2 each of which decodes a 16-bit prefix code, and a 32-bit decoder 32*b*-D which decodes a 32-bit non-prefix variable-length instruction, are separately provided as the decoders in the instruction decode unit DECE. The 32-bit decoder 32-D is illustrated with being divided into an upper-side 32UDEC and a lower-side 32LDEC in FIG. 9. It is, however, needless to say that both upper and lower parts configure single decode logic in conjunction with each other.

The data processor to be described here is configured as a 2-way superscalar processor which executes the 16-bit fixed-length instruction and the variable-length instruction with the prefix by two pipelines Pipe1 and Pipe2 as to the instructions. The fixed-length instruction decoder BDYDEC1 and the prefix decoder PRFDEC1 correspond to the pipeline Pipe1, whereas the fixed-length instruction decoder BDYDEC2 and the prefix decoder PRFDEC2 correspond to the pipeline Pipe2. DB1 and DB3, and DB0 and DB2 disposed in stages prior to the fixed-length instruction decoders BDYDEC1 and BDYDEC2 and the prefix decoders PRFDEC1 and PRFDEC2 are respectively configured as buffers which receive the outputs of the predecoders DPD0 through DPD3 and the attribute information pieces A0 through A3 corresponding thereto. It is convenient to understand that they are input buffers for decoders or output buffers for selectors. The upper side 32UDEC of the 32-bit decoder 32*b*-D is supplied with the outputs of the predecoders DPD0 through DPD3 and the attribute information pieces A0 through A3 corresponding thereto via the buffer DB1. The lower side 32LDEC of the 32-bit decoder 32*b*-D is supplied with the outputs of the predecoders DPD0 through DPD3 and the attribute information pieces A0 through A3 corresponding thereto via the buffer DB2. Incidentally, objects to be decoded inputted to the decoders PRFDEC1, BDYDEC1, PRFDEC2, BDYDEC2 and 32*b*-D are respectively illustrated as Ih through Ik for convenience, and the attribute information pieces are respectively illustrated as Ah through Ak for convenience.

Selectors SEL0 through SEL3 and SELA through SELD are respectively disposed between the predecoders DPD0 through DPD3 and the decoders PRFDEC1, BDYDEC1, PRFDEC2, BDYDEC2 and 32*b*-D. The selectors SEL0 through SEL3 and SELA through SELD respectively decide the correspondences between the codes Ih, Ii, Ij and Ik and codes I0, I1, I2 and I3 and decide the correspondences between the attribute information pieces Ah, Ai, Aj and Ak and A0, A1, A2 and A3. The state of selection by each of the selectors SEL0 and SELA is determined by the selection signal S0, the state of selection by each of the selectors SEL1 and SELB is determined by the selection signal S1, the state of selection by each of the selectors SEL2 and SELC is determined by the selection signal S2, and the state of selection by each of the selectors SEL3 and SELD is determined by the selection signal S3, respectively.

Figure 10:
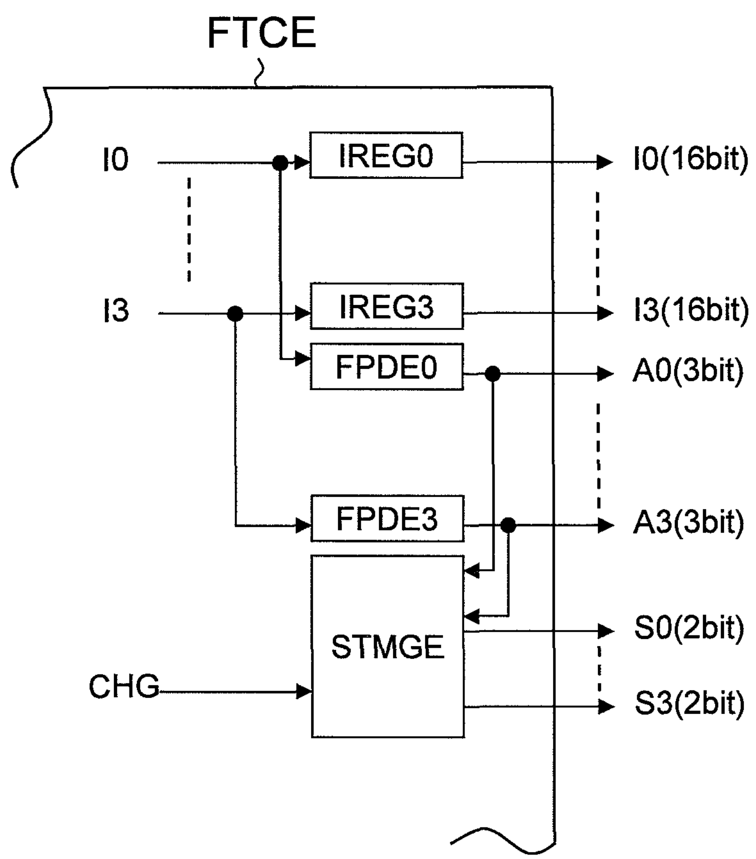
FIG. 10 is a block diagram schematically showing a configuration for generating attribute and selection signals employed in the instruction fetch unit shown in FIG. 9.

FIG. 10 schematically shows a configuration in which the attribute signals A0 through A3 and the selection signals S0 through S3 at the instruction fetch unit FTCE of FIG. 9 are generated. The attribute signals A0 through A3 are generated by their corresponding predecoders FPDE0 through FPDE3 which respectively predecode the codes I0 through I3 in 16-bit units. The predecoders FPDE0 through FPDE3 respectively determine whether the input 16-bit codes I0 through I3 respectively correspond to a 16-bit fixed-length instruction code, a 16-bit prefix code or one (32-bit non-prefix variable-length instruction) other than it, and output the attribute signals A0 through A3 of codes corresponding to the result of determination. Although not limited in particular, when the input instruction code is of the fixed-length instruction code, a bit pattern (e.g., 3' b001) indicative of a fixed-length instruction code is outputted. Similarly, when the instruction code is of the prefix code, a bit pattern (e.g., 3' b100) indicative of a prefix code is outputted. When the instruction code is of the variable-length instruction code corresponding to the non-prefix code, a bit pattern (e.g., 3' b010) indicative of a non-prefix 32-bit instruction code is outputted.

Although not limited in particular, the selection signals S0 through S3 are generated by a selection control circuit STMG based on the attribute signals A0 through A3 and another control signal CHG.

The form of generation of the selection signals S0 through S3 by the selection control circuit STMG is illustrated in FIG. 11. Assuming that an instruction execution cycle at each pipeline for the 2-way superscalar is one cycle and instructions fetched into the instruction registers IREG0 through IREG3 are executed in two-cycle units, the decoders BDYDEC1 and PRFDEC1 of the pipeline Pipe1 and the decoders BDYDEC2 and PRFDEC2 of the pipeline Pipe2 respectively input codes one by one in one-cycle units and perform decoding thereon. As to the 32-bit non-prefix variable-length instruction, the decoders BDYDEC1 and 32UDEC share a code's input path, and the decoders BDYDEC2 and 32LDEC share a code's input path. In terms of such a relationship, when the two 32-bit non-prefix variable-length instructions are fetched into the instruction registers IREG0 through IREG3, instructions are supplied to the 32-bit decoder 32*b*-D for every instruction in cycle units. Otherwise, instructions are separately supplied to the upper 32UDEC and the lower 32LDEC for every 16 bits in cycle units, and two cycles are necessary for the supply of the instructions to the 32-bit decoder 32*b*-D.

Thus, according to the conditions for the instruction fetches of the instruction registers IREG0 through IREG3, the form of each fetch is given as eleven forms of A through K, and instruction codes and attribute information are sequentially supplied to their corresponding decoders selected by the selectors in a cycle CYC1 and a cycle CYC2 in accordance with the form of each fetch. In the representation of FIG. 11 described above, I16 of I16(*x*) means a fixed-length instruction code, and (x) means that the code is stored in its corresponding instruction register IREGx. Iprf of Iprf(x) means that it is of a prefix code, and (x) is similar to the above. I32U of I32U(x) means upper 16 bits of a non-prefix variable-length instruction. Likewise, I32L of I32L(x) means lower 16 bits of the non-prefix variable-length instruction.

The forms A through E are the same as those in FIG. 3. As illustrated in each of the forms B, C, D, E, I and J, a prefix code of a 32-bit variable-length instruction using the prefix code is first supplied to the prefix decoder PRFDEC1 or PRFDEC2 with respect to the 32-bit variable-length instruction, and an instruction code modified with the corresponding prefix code is thereafter supplied to the instruction decoder BDYDEC1 or BDYDEC2 of its corresponding pipeline. According to it, in order to decode the instruction with the prefix, the decoders each corresponding to the prefix-free instruction are left as they are, and the decoders each corresponding to the prefix code are added, thus making it possible to eliminate an influence on the execution of the existing fixed-length instruction. The prefix code is supplied to its corresponding decoder before the fixed-length instruction code modified with the prefix code, thereby making it possible to modify the operation of decoding the fixed-length instruction according to the result of decoding of each prefix code.

When a 32-bit non-prefix variable-length instruction and other instructions exist in mixed form and are fetched into the registers IREG0 through IREG3 as illustrated in the forms F, G, H, I and J, the non-prefix variable-length instruction requires two cycles and is supplied to the decoder 32*b*-D. When two 32-bit non-prefix variable-length instructions are continuously fetched into the registers IREG0 through IREG3 as illustrated in the form K, the respective non-prefix variable-length instructions are supplied to the decoder 32*b*-D for each cycle.

The control signal CHG is used for, for example, switching between each instruction supplied to the pipeline Pipe1 and each instruction supplied to the pipeline Pipe2. In the form A, for example, I16(0) and I16(1), and I16(2) and I16(3) can be designated by the control signal CHG so as to take the pipeline Pipe2 and the pipeline Pipe1 respectively. It is needless to say that the selection control circuit STMGE is disposed in the fetch unit FTCE for convenience, but may be placed in the decode unit DECE or the like.

The instruction decoders PRFDEC1, BDYDEC1, PRFDEC2, BDYDEC2 and 32*b*-D respectively recognize the type of input codes by receiving the attribute information pieces Ah through Ak to thereby enable decode operations. For example, when the input code being of the prefix code is not notified by Ah and Aj, the prefix decoders PRFDEC1 and PRFDEC2 stop their operations. Thus, when the frequency of use of the instruction with the prefix is low, the input of a clock is stopped in nonuse of the variable-length instruction using the prefix, thereby making it possible to suppress power consumption. Further, the accuracy of control is enhanced and the on/off of the variable-length instruction decode unit is dynamically controlled, whereby it is also possible to perform optimization of power consumption. The instruction decoders BDYDEC1, BDYDEC2 and 32*b*-D also similarly perform low power consumption control similar to the above using the attribute information pieces Ai and Aj.

The data processor of the fifth embodiment described based on FIG. 9 is provided with mode control logic for controlling switching between a fixed-length instruction operation mode and a variable-length instruction operation mode, as the operation mode control unit already described based on FIG. 4. As described above, MR1 is a mode register which designates an operation mode in which only the fixed-length instruction can be carried out, MR2 is a mode register which designates an operation mode in which the fixed-length instruction and the instruction with the prefix can be executed, and MR3 is a mode register which designates an operation mode in which the fixed-length instruction, the prefixed instruction, and the non-prefix variable-length instruction can be executed. When the mode register MR1 is set, the operation mode is selected in which only the fixed-length instruction can be executed. In this mode, a prefix invalid signal PRFDECinv and a native instruction invalid signal 32*b*DECinv are both enabled so that the input of a clock to the prefix decoders PRFDEC1 and PRFDEC2 and the 32-bit decoder 32*b*-D is stopped or the input of operating power is cut off. When the mode register MR2 is set, the mode is selected in which the fixed-length instruction and the instruction with the prefix can be executed. Thus, a 32*b*DECinv is outputted as being enabled, so that the clock input of the 32-bit decoder 32*b*-D is stopped or the input of the operating power is cut off. When the mode register MR3 is set, a mode is selected in which the fixed-length instruction, the prefixed instruction and the non-prefix variable-length instruction are executable. At this time, both the prefix invalid signal PRFDECinv and the native instruction invalid signal 32*b*DECinv are invalidated, so that the input of the clock to each of the decoders PRFDEC1, PRFDEC2, 32*b*-D, BDYDEC1 and BDYDEC2 or the input of the operating power is not cut off. Owing to these operations, power consumption of the data processor can further be suppressed in addition to the low power consumption based on the attribute signals.

The data processor shown in FIG. 9 can also adopt the module configuration typically shown in FIG. 5.

Sixth Embodiment

Figure 12:
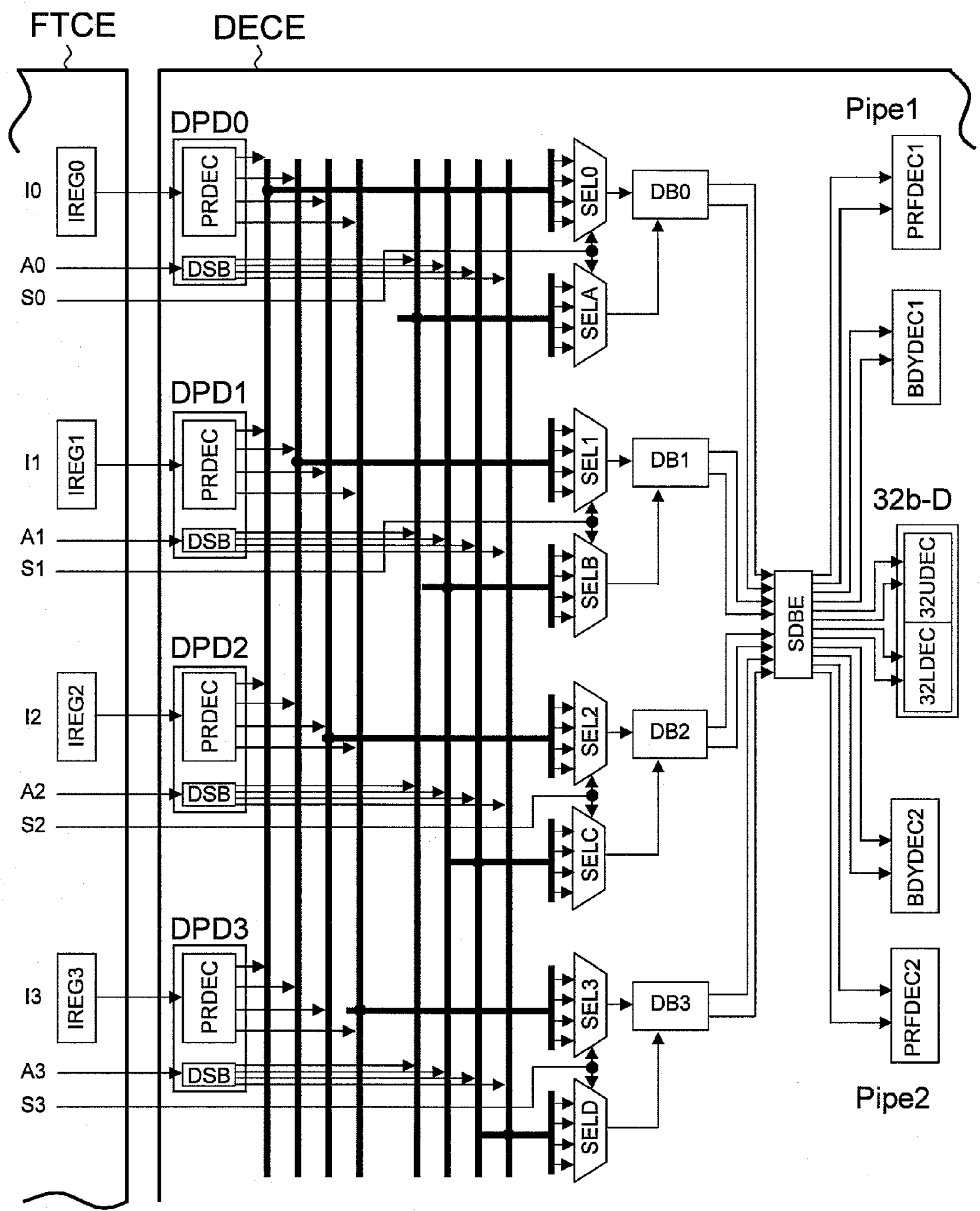
FIG. 12 is a block diagram of a sixth embodiment showing an example of an instruction decode unit where the function thereof is reduced with respect to the data processor of FIG. 9 in its logic synthesis.

FIG. 12 shows an example illustrative of an instruction fetch unit and an instruction decode unit where the functions thereof are reduced with respect to the data processor of FIG. 9 in its logic synthesis. FIG. 12 is different from FIG. 9 in that an instruction distribution circuit SDBE is disposed between DB0 through DB3 and instruction decoders BDYDEC1, BDYDEC2, PRFDEC1, PRFDEC2 and 32*b*-D. The configuration of FIG. 12 is realized by an option description or the like related to an RTL (Register Transfer Logic) description in logic synthesis of the data processor. In this case, the instruction distribution circuit SDBE may be a mere secondary buffer or may perform again, a selective operation similar to the whole of selectors SEL0 through SEL3 which perform selective operations by selection signals S0 through S3 respectively. Since the present embodiment is similar to the fifth embodiment in other respects, their detailed description is omitted.

Seventh Embodiment

Figure 13:
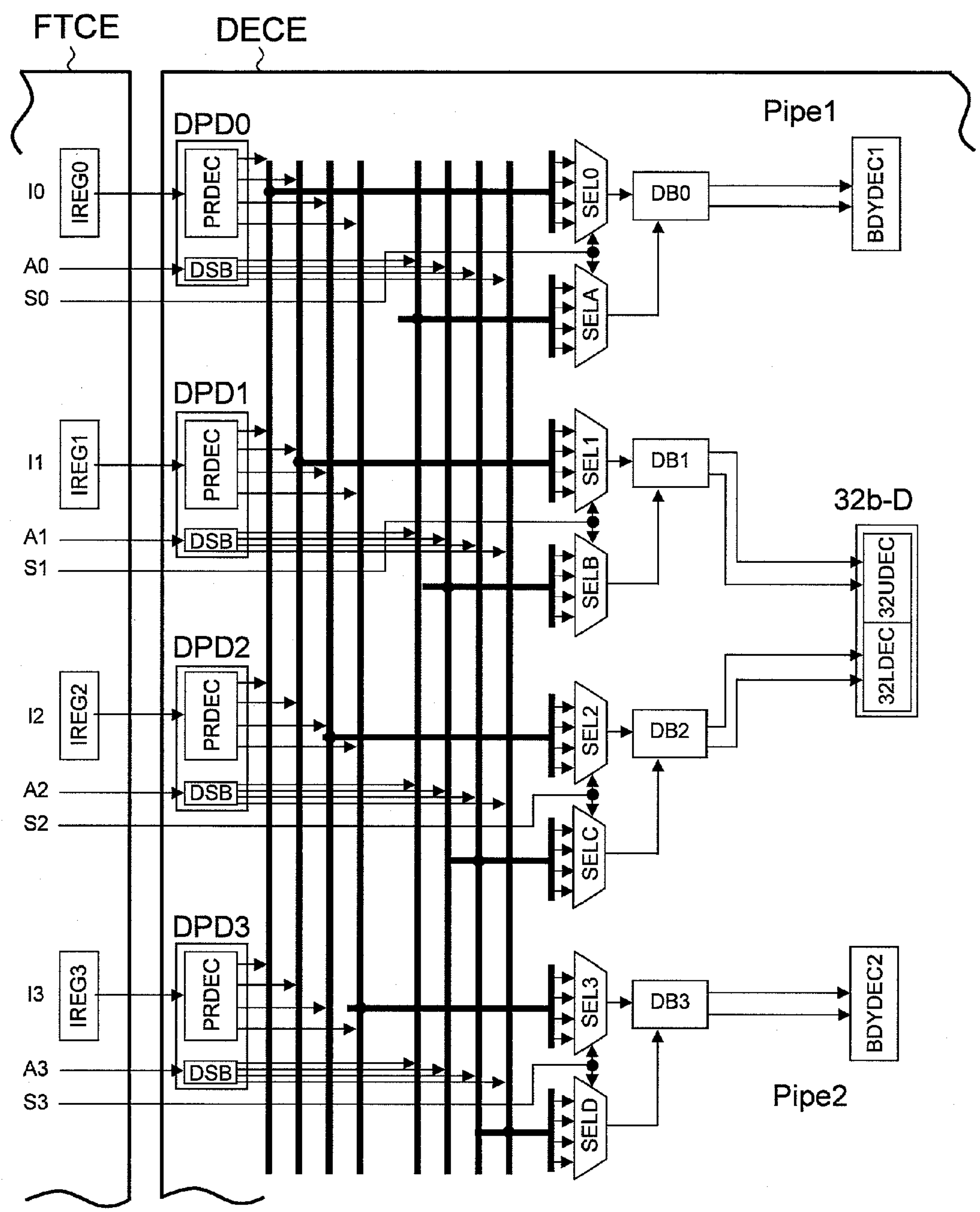
FIG. 13 is a block diagram of a seventh embodiment showing an example of another instruction decode unit where the function thereof is reduced with respect to the data processor of FIG. 9 in its logic synthesis.

FIG. 13 shows an example illustrative of another instruction decode unit and instruction decode unit where the functions thereof are reduced with respect to the data processor of FIG. 9 in its logic synthesis. FIG. 13 is different from FIG. 9 in that the configuration for decoding the prefix code is omitted. For example, an instruction decode unit of the data processor at which only an instruction set of a 16-bit fixed-length instruction and a non-prefix variable-length instruction is used, is configured by performing, in logic synthesis of the data processor, an option description related to an RTL (Register Transfer Logic) description, e.g., such an option description that when an instruction set of prefixed variable-length instructions is unnecessary, for example, decode logic of the prefixed variable-length instructions are not synthesized. This example is shown in FIG. 13. In this example in particular, a fixed-length instruction decoder BDYDEC1 is coupled to a buffer DB0, and a fixed-length instruction decoder BDYDEC2 is coupled to a buffer DB3. In this case, a timing control circuit STMGE may generate selection signals S0 through S3 so as to realize such forms as illustrated in FIG. 15. In a manner similar to the above, switching between pipelines Pipe1 and Pipe2 each of which supplies a 16-bit fixed-length instruction, may be designated by a control signal CHG. Since the present embodiment is similar to the fifth embodiment in other respects, their detailed description is omitted.

Eighth Embodiment

Figure 14:
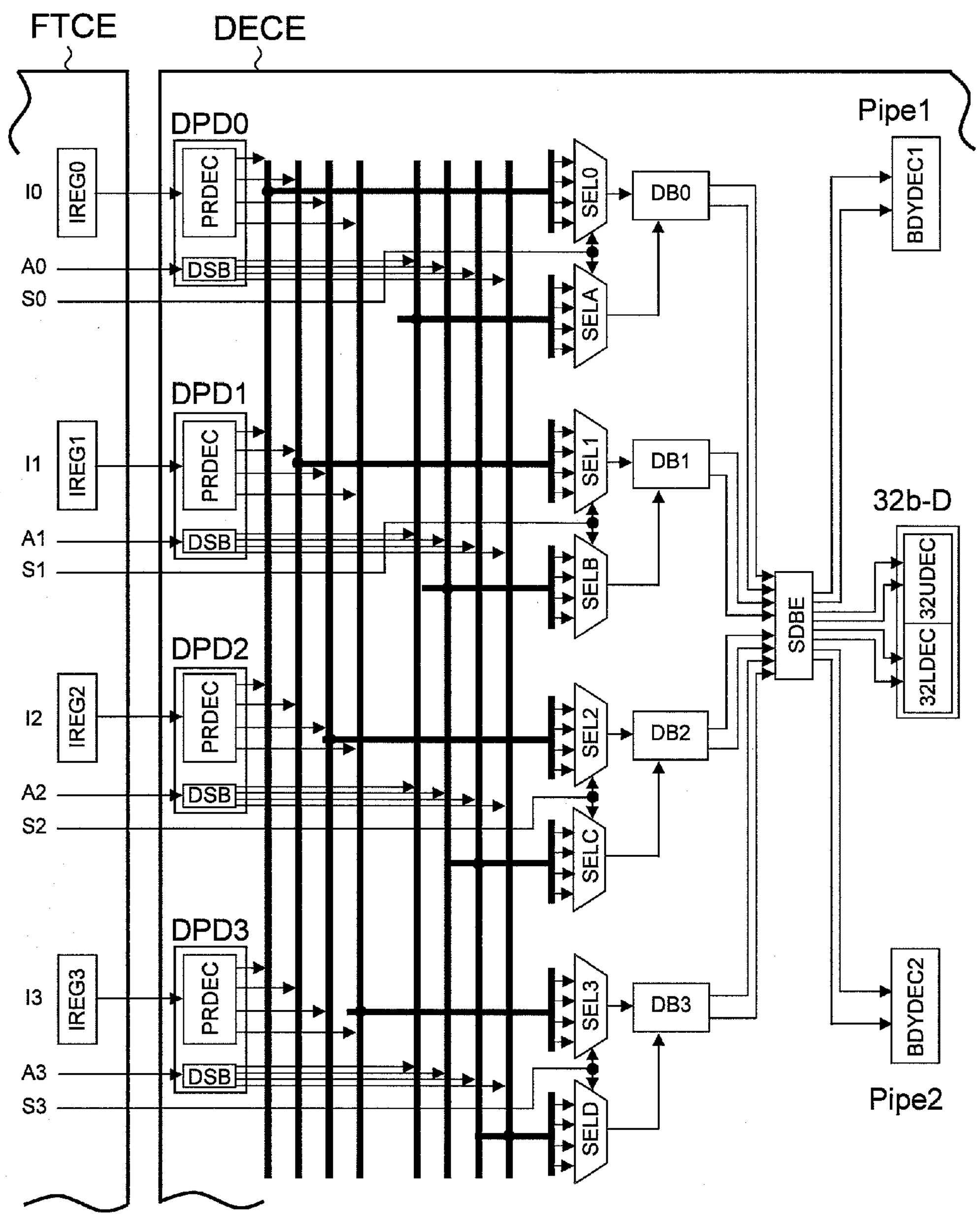
FIG. 14 is a block diagram of an eighth embodiment showing an example of a further instruction decode unit where the function thereof is reduced with respect to the data processor of FIG. 9 in its logic synthesis.

FIG. 14 shows an example illustrative of yet another instruction fetch unit and another instruction decode unit where the functions thereof are reduced with respect to the data processor of FIG. 9 in its logic synthesis. In such a configuration as shown in FIG. 14, an instruction distribution circuit SDBE is disposed between buffers DB0 through DB3 and instruction decoders BDYDEC1, BDYDEC2 and 32*b*-D with respect to FIG. 13. In a manner similar to the above, the configuration of FIG. 14 is realized by an option description or the like related to an RTL (Register Transfer Logic) description in logic synthesis of the data processor. In this case, the instruction distribution circuit SDBE may be a mere secondary buffer or may perform again, a selective operation similar to the whole of selectors SEL0 through SEL3 which perform selective operations by selection signals S0 through S3 respectively. The logic of selection by the selection signals S0 through S3 is identical to the logic described in FIG. 15. Since the present embodiment is similar to the fifth embodiment in other respects, their detailed description is omitted.

Although the invention made above by the present inventors has been described specifically on the basis of the preferred embodiments, the present invention is not limited to the embodiments referred to above. It is needless to say that various changes may be made thereto within the scope not departing from the gist thereof.

For example, the instruction code for the fixed-length instruction is not limited to 16 bits, but may be 32 bits or the like. The prefix code is not limited to 16 bits either, but may be 32 bits or the like. The number of instruction registers in an instruction fetch unit is not limited to four, but may be eight or the like. The number of pipelines is not limited to two either, but may be four or the like. There may be provided predecoders as destinations to supply instructions of instruction registers in accordance with instruction's attribute information. The decoders for the supply destinations may be predecoders or present decoders. Predecoders which determine instruction attributes and output attribute signals are not limited to the case in which they are disposed in a fetch unit, but may be disposed in an instruction decode unit or other circuit units. Buffers typified by DB0 through DB3 and SDB may be omitted.

What is claimed is:

1. A data processor including a first mode corresponding to a fixed-length instruction, and a second mode corresponding to a variable-length instruction set by applying a prefix to the fixed-length instruction, the data processor comprising:

an instruction fetch unit configured to fetch four codes of a plurality of instructions in parallel and having a plurality or decoders comprising first, second, third and fourth predecoders each of which performs predecoding for determining whether a corresponding one of said fetched codes is of a fixed-length instruction in the first mode, a fixed-length instruction corresponding to part of a variable-length instruction in the second mode or a prefix corresponding to part of the variable-length instruction in the second mode;

a first pipeline comprising a first prefix code decode unit and a first fixed-length instruction decode unit, and a second pipeline comprising a second prefix code decode unit and a second fixed-length instruction decode unit;

a first selector for selecting one of outputs of the first, second, third and fourth predecoders and outputting the same to the first fixed-length instruction decode unit;

a second selector for selecting one of the outputs of the first, second, third and fourth predecoders and outputting the same to the second fixed-length instruction decode unit;

a third selector for selecting one of the outputs of the first, second, third and fourth predecoders and outputting the same to the first prefix code decode unit; and a fourth selector for selecting one of the outputs of the first, second, third and fourth predecoders and outputting the same to the second prefix code decode unit, wherein in the first mode, a first fixed-length instruction is inputted to the first predecoder, a second fixed-length instruction is inputted to the second predecoder, a third fixed-length instruction is inputted to the third predecoder, and a fourth fixed-length instruction is inputted to the fourth predecoder, wherein the first predecoder predecodes the first fixed-length instruction, the second predecoder predecodes the second fixed-length instruction, the third predecoder predecodes the third fixed-length instruction, and the fourth predecoder predecodes the fourth fixed-length instruction, wherein the first selector selects one of the outputs of the first through fourth predecoders and outputs the same to the first fixed-length instruction decode unit based on results of determination by the plurality of predecoders, wherein the second selector selects one of the outputs of the first through fourth predecoders and outputs the same to the second fixed-length instruction decode unit based on results of determination by the plurality of predecoders, wherein in the second mode, a first prefix corresponding to part of a first variable-length instruction, a third fixed-length instruction corresponding to part of the first variable-length instruction, a second prefix corresponding to part of a second variable-length instruction, or a fourth fixed-length instruction corresponding to part of the second variable-length instruction is inputted to the first predecoder, wherein the first prefix corresponding to part of the first variable-length instruction, the third fixed-length instruction corresponding to part of the first variable-length instruction, the second prefix corresponding to part of a second variable-length instruction, or the fourth fixed-length instruction corresponding to part of the second variable-length instruction is inputted to the second predecoder, wherein the first prefix corresponding to part of the first variable-length instruction, the third fixed-length instruction corresponding to part of the first variable-length instruction, the second prefix corresponding to part of a second variable-length instruction, or the fourth fixed-length instruction corresponding to part of the second variable-length instruction is inputted to the third predecoder, wherein the first prefix corresponding to part of the first variable-length instruction, the third fixed-length instruction corresponding to part of the first variable-length instruction, second prefix corresponding to part of a second variable-length instruction, or the fourth fixed-length instruction corresponding to part of the second variable-length instruction is inputted to the fourth predecoder, wherein the first predecoder predecodes the first prefix, the third fixed-length instruction, the second prefix or the fourth fixed-length instruction, wherein the second predecoder predecodes the first prefix, the third fixed-length instruction, the second prefix or the fourth fixed-length instruction, wherein the third predecoder predecodes the first prefix, the third fixed-length instruction, the second prefix or the fourth fixed-length instruction, wherein the fourth predecoder predecodes the first prefix or the third fixed-length instruction or the second prefix or the fourth fixed-length instruction, wherein the third selector or the fourth selector selects one of the output of the first predecoder, the output of the second predecoder, the output of the third predecoder, or the output of the fourth predecoder, and outputs the same to the first prefix code decode unit or the second prefix code decode unit, based on results of determination by the plurality of predecoders, wherein the first selector or the second selector selects one of the outputs of the first through fourth predecoders and outputs the same to the first fixed-length instruction decode unit or the second fixed-length instruction decode unit, based on results of determination by the plurality of predecoders, wherein in the first prefix corresponding, to part of the first variable-length instruction is supplied to the first prefix code decode unit, followed by supply of the third fixed-length instruction to the first fixed-length instruction decode unit, and the second prefix corresponding to part of the second variable-length instruction is supplied to the second prefix code decode unit, followed by supply of the fourth fixed-length instruction to the second fixed-length instruction decode unit, based on results of determination by the plurality of predecoders, respectively, and wherein the fixed-length instruction in the first mode composes a code of a first length, the variable-length instruction in the second mode composes a code of the fixed-length length instruction of the first length and a code of the prefix of the first length.

2. The data processor according to claim 1, wherein in the first mode, the supply of power to the first and second prefix decode units is cut off.

3. The data processor according to claim 1, wherein each of the first, second, third and fourth predecoders outputs an instruction attribute signal indicative of whether the input instruction is of a fixed-length instruction in the first mode, a fixed-length instruction corresponding to part of a variable-length instruction in the second mode or a prefix corresponding to part of the variable-length instruction in the second mode.

4. The data processor according to claim 1, further comprising mode registers for performing the setting of stopping the operations of the first and second prefix code decode units or invalidating the first and second prefix code decode units in the first mode.

5. A data processor having, as an executable instruction set, a first instruction comprised of an instruction code of a first code length, and a second instruction, the data processor comprising:

a plurality of instruction register units which respectively fetch instructions with a plurality of the instructions as units in an instruction fetch unit;

a plurality of predecoders which respectively decode the plurality of instructions fetched into the instruction register units and determine whether the instructions respectively correspond to an instruction code of the first instruction, an instruction code of the second instruction, or a prefix code of the second instruction in the instruction fetch unit;

a plurality of first decoders which respectively decode the instruction codes of the instructions fetched into the plurality of instruction register units;

a plurality of second decoders which respectively decode the prefix codes of the instructions fetched into the plurality of instruction register units; and a plurality of selectors which supply the instruction codes to the plurality of first decoders and supply the prefix codes to the plurality of second decoders, based on the results of determination by the plurality of predecoders, respectively, wherein the plurality of selectors supply the instruction codes to the plurality of first decoders with respect to the first instruction, and supply the prefix codes to the plurality of second decoders with respect to the second instruction, followed by supply of the instruction codes modified with the prefix codes to the plurality or first decoders, based on results of determination by the plurality of predecoders, respectively, and wherein the instruction code of the first instruction of the first code length is modified with a prefix code of the first code length.

6. The data processor according to claim 5, wherein a pair of the first and second decoders is provided according to the number of pipelines to execute instructions by a plurality of the pipelines, and wherein the selectors respectively perform control for supplying the instruction and prefix codes configuring the second instruction to the first and second decoders of the same pipeline, based on the results of determination by the plurality of predecoders.

7. The data processor according to claim 5, wherein the second instruction decoders cut off the supply of operating power or give instructions for deactivation of circuit operations in a first mode for executing only the first instruction.

8. The data processor according to claim 5, wherein the plurality of predecoders respectively output attribute signals each indicating whether the instruction code is the instruction code of the first instruction, the instruction code of the second instruction or the prefix code of the second instruction.

9. The data processor according to claim 5, further comprising mode registers each of which designates the first mode for executing only the first instruction or a second mode for executing both of the first and second instructions.

10. A data processor including, as an executable instruction set, a first instruction comprised of a first instruction code of a first code length, a second instruction of a second code length, and a third instruction comprised of a second instruction code of a second code length, the data processor comprising:

a plurality of instruction register units which respectively fetch instructions with a plurality of the instructions as units in an instruction fetch unit;

a plurality of predecoders which respectively decode the plurality of instructions fetched into the plurality of instruction register units and determine whether the instructions respectively correspond to a first instruction code of the first instruction, a first instruction code of the second instruction, a prefix code of the second instruction, or a second instruction code of a third instruction in the instruction fetch unit;

a plurality of first decoders each of which decodes the first instruction code fetched into each of the instruction register units;

a plurality of second decoders each of which decodes the prefix code of the second instruction fetched into each of the instruction register units;

a plurality of third decoders each of which decodes the second instruction code fetched into each of the instruction register units; and a plurality of selectors each of which supplies the first instruction code to the first decoder, supplies the prefix code to the second decoder, and supplies the second instruction code to the third decoder, based on each of the results of determination by the plurality of predecoders, wherein each of the selectors supplies the first instruction code to the first decoder with respect to the first instruction and supplies the prefix code to the second decoder with respect to the second instruction, and thereafter supplies the first instruction code modified with the prefix code to the first decoder and supplies the second instruction code to the third decoder with respect to the third instruction, based on results of determination by the plurality of predecoders, respectively, and wherein the instruction code of the first instruction of the first code length is modified with a prefix code of the first code length.

11. The data processor according to claim 10, wherein a pair of the first and second decoders is provided according to the number of pipelines to execute instructions by a plurality of the pipelines, and wherein each of the selectors performs control for supplying the first instruction code and the prefix code corresponding thereto, configuring the second instruction to the first and second decoders of the same pipeline, based on each of the results of determination by the plurality of predecoders.

12. The data processor according to claim 10, wherein the second and third instruction decoders cut off the supply of operating power or give instructions for deactivation of circuit operations in an operation mode for executing only the first instruction, and the third instruction decoder cuts off the supply of operating power or gives instructions for deactivation of circuit operations in an operation mode for executing the first and second instructions.

13. The data processor according to claim 10, wherein the plurality of predecoders respectively output attribute signals each indicating whether an instruction code is the first instruction code of the first instruction, the first instruction code of the second instruction, the prefix code of the second instruction, or the second instruction code of the third instruction.

14. The data processor according to claim 10, further comprising a plurality of mode registers each of which designates a first mode for executing only the first instruction, a second mode for executing both of the first and second instructions, or a third mode for executing all of the first through third instructions.

* * * * *